United States Patent [19]

Schachle et al.

[11] Patent Number: 4,503,673
[45] Date of Patent: Mar. 12, 1985

[54] WIND POWER GENERATING SYSTEM

[76] Inventors: Charles Schachle, 1032 Grant St., Moses Lake, Wash. 98837; Patrick J. Schachle; Edward C. Schachle, both of 18427 Military Rd. S., Seattle, Wash. 98188; John R. Schachle, 625 Wellington, #A-12, Walla Walla, Wash. 99362

[21] Appl. No.: 42,496

[22] Filed: May 25, 1979

[51] Int. Cl.³ ............... F03D 7/04; F03D 9/00; F03D 11/02; F04B 17/02
[52] U.S. Cl. ............... 60/398; 60/445; 290/44; 290/55; 416/41; 417/334
[58] Field of Search .......... 60/398, 325, 445; 290/44, 55; 416/9, 37, 41, 43, 44, 98, 41 R; 417/334; 405/75

[56] References Cited

U.S. PATENT DOCUMENTS

| | | | |
|---|---|---|---|
| 3,269,121 | 8/1966 | Bening | 60/445 X |
| 3,952,723 | 4/1976 | Browning | 417/334 X |
| 4,088,420 | 5/1978 | Jacobs et al. | 416/9 |
| 4,149,092 | 4/1979 | Cros | 290/55 |
| 4,160,170 | 7/1979 | Harner et al. | 290/44 |
| 4,161,658 | 7/1979 | Patrick | 290/44 |

Primary Examiner—Irwin C. Cohen
Attorney, Agent, or Firm—Christie, Parker & Hale

[57] ABSTRACT

Normally feathered propeller blades of a wind power generating system unfeather in response to the actuation of a power cylinder that responds to actuating signals. Once operational, the propellers generate power over a large range of wind velocities. A maximum power generation design point signals a feather response of the propellers so that once the design point is reached no increase in power results, but the system still generates power. At wind speeds below this maximum point, propeller speed and power output optimize to preset values. The propellers drive a positive displacement pump that in turn drives a positive displacement motor of the swash plate type. The displacement of the motor varies depending on the load on the system, with increasing displacement resulting in increasing propeller speeds, and the converse. In the event of dangerous but not clandestine problems developing in the system, a control circuit dumps hydraulic pressure from the unfeathering cylinder resulting in a predetermined, lower operating pressure produced by the pump. In the event that a problem of potentially clandestine consequence arises, the propeller unfeathering cylinder immediately unloads. Upon startup, a bypass around the motor is blocked, applying a pressure across the motor. The motor drives the generator until the generator reaches a predetermined speed whereupon the generator is placed in circuit with a utility grid and permitted to motor up to synchronous speed.

58 Claims, 25 Drawing Figures

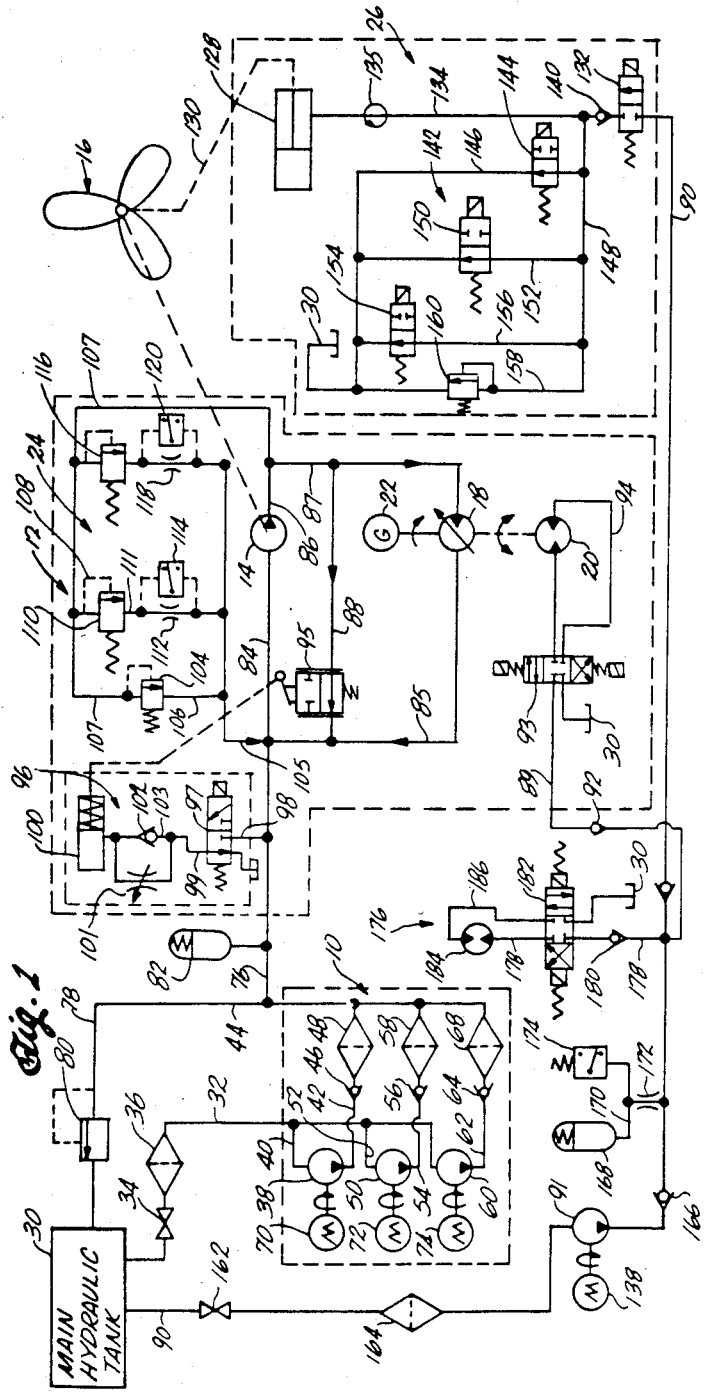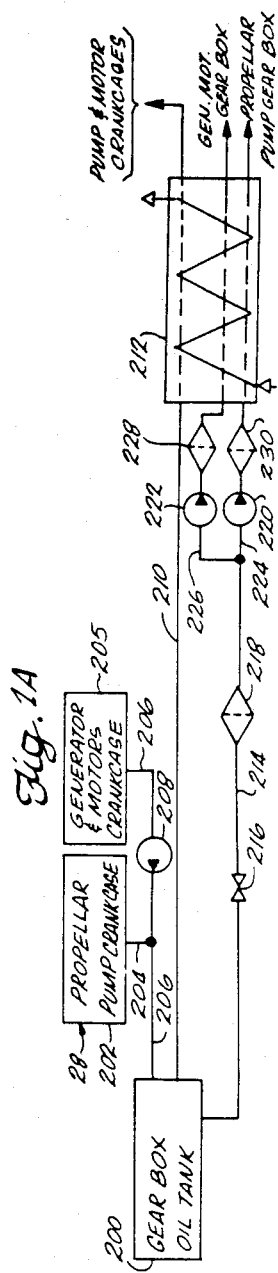
Fig. 1
Fig. 1A

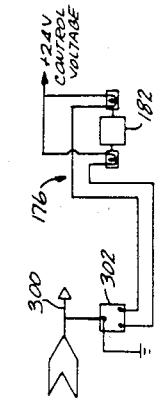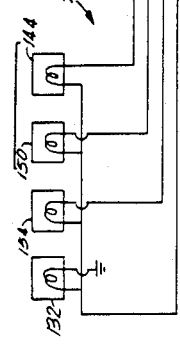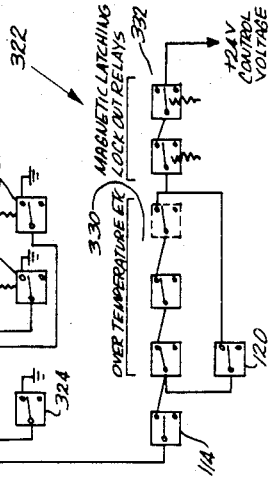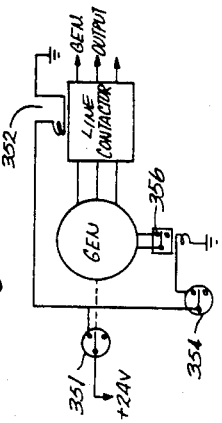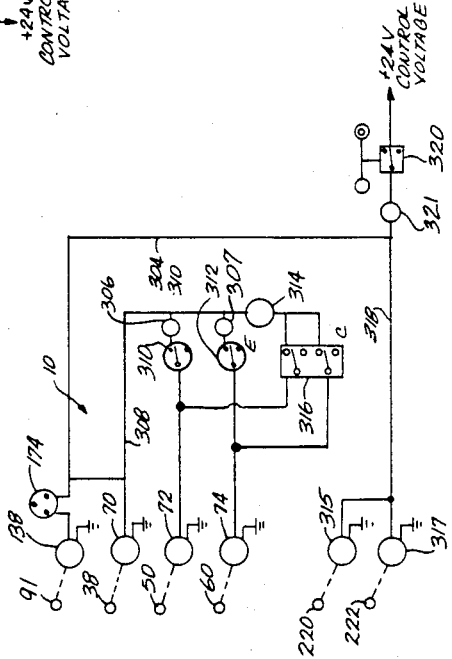

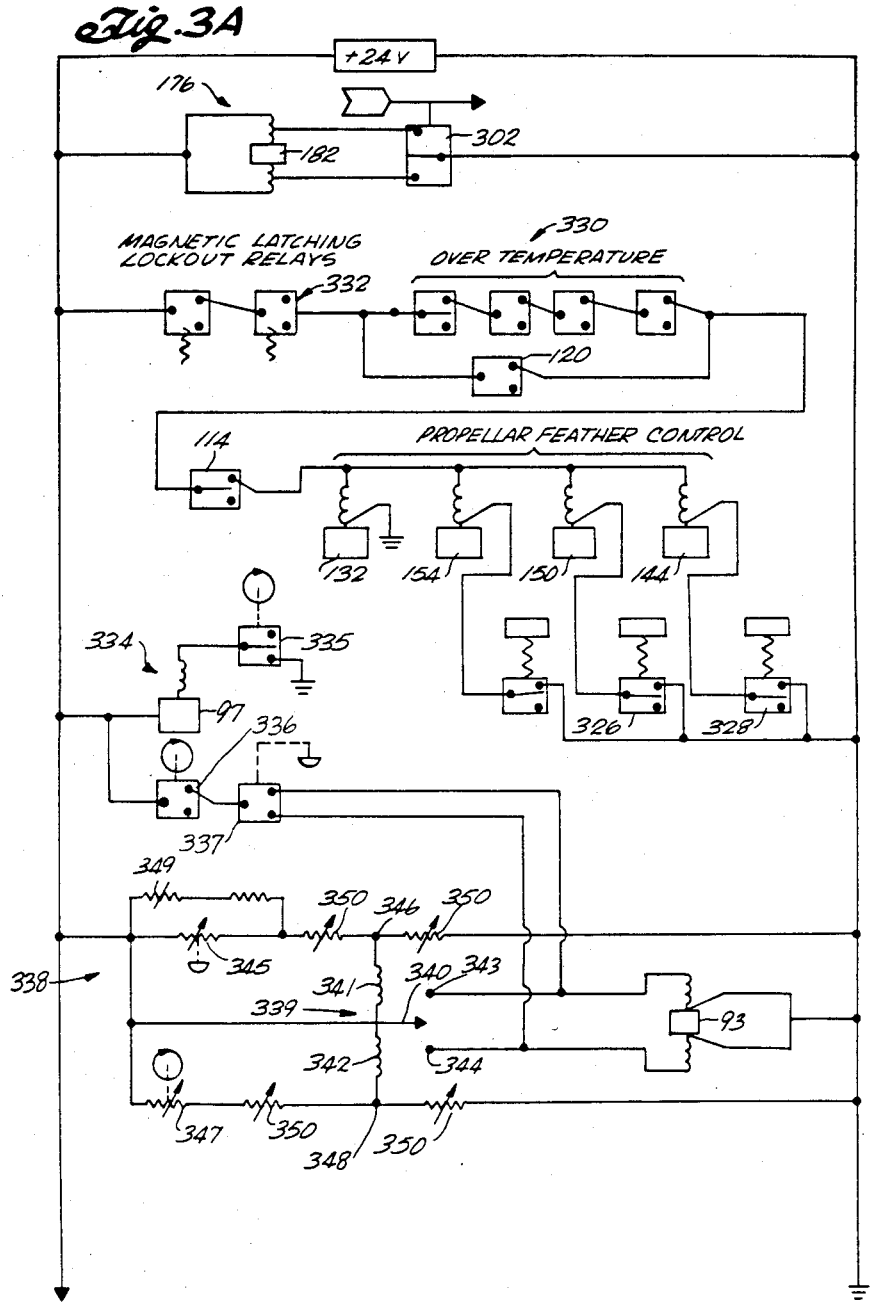

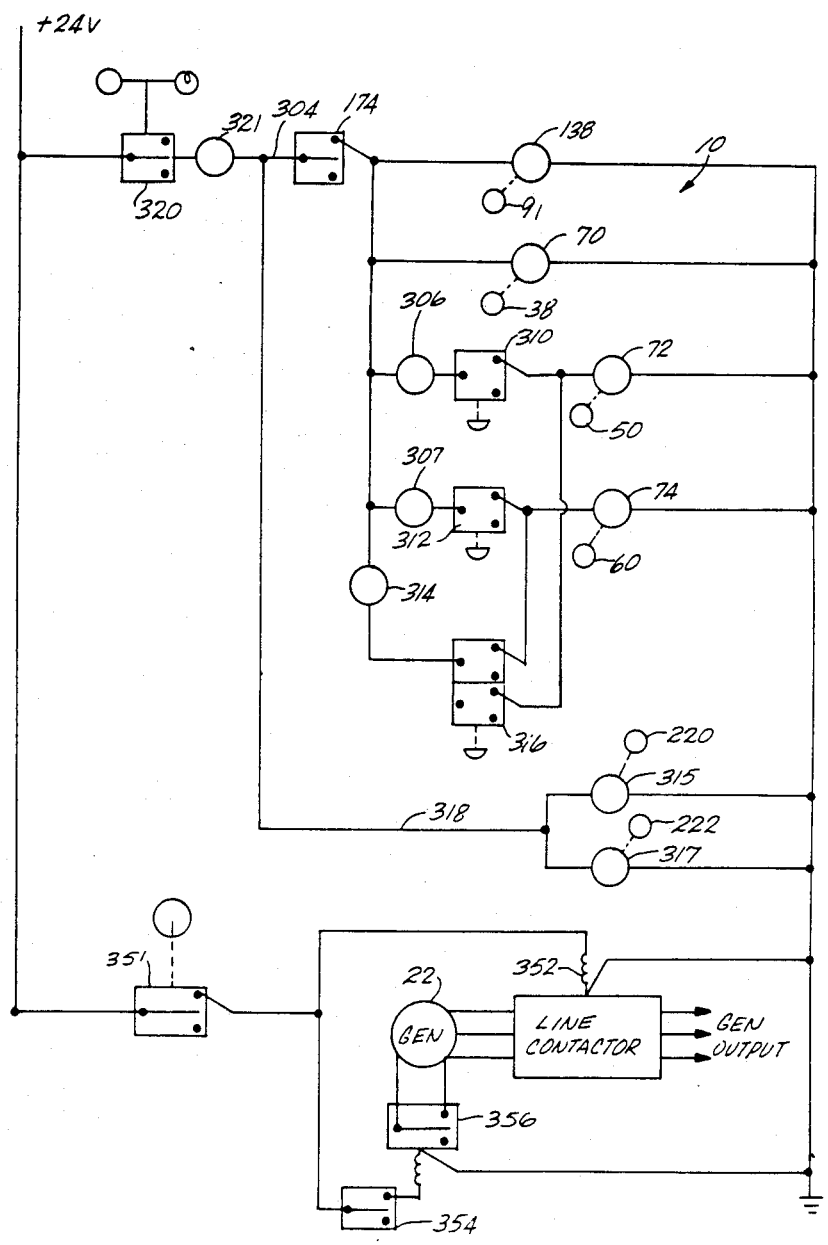

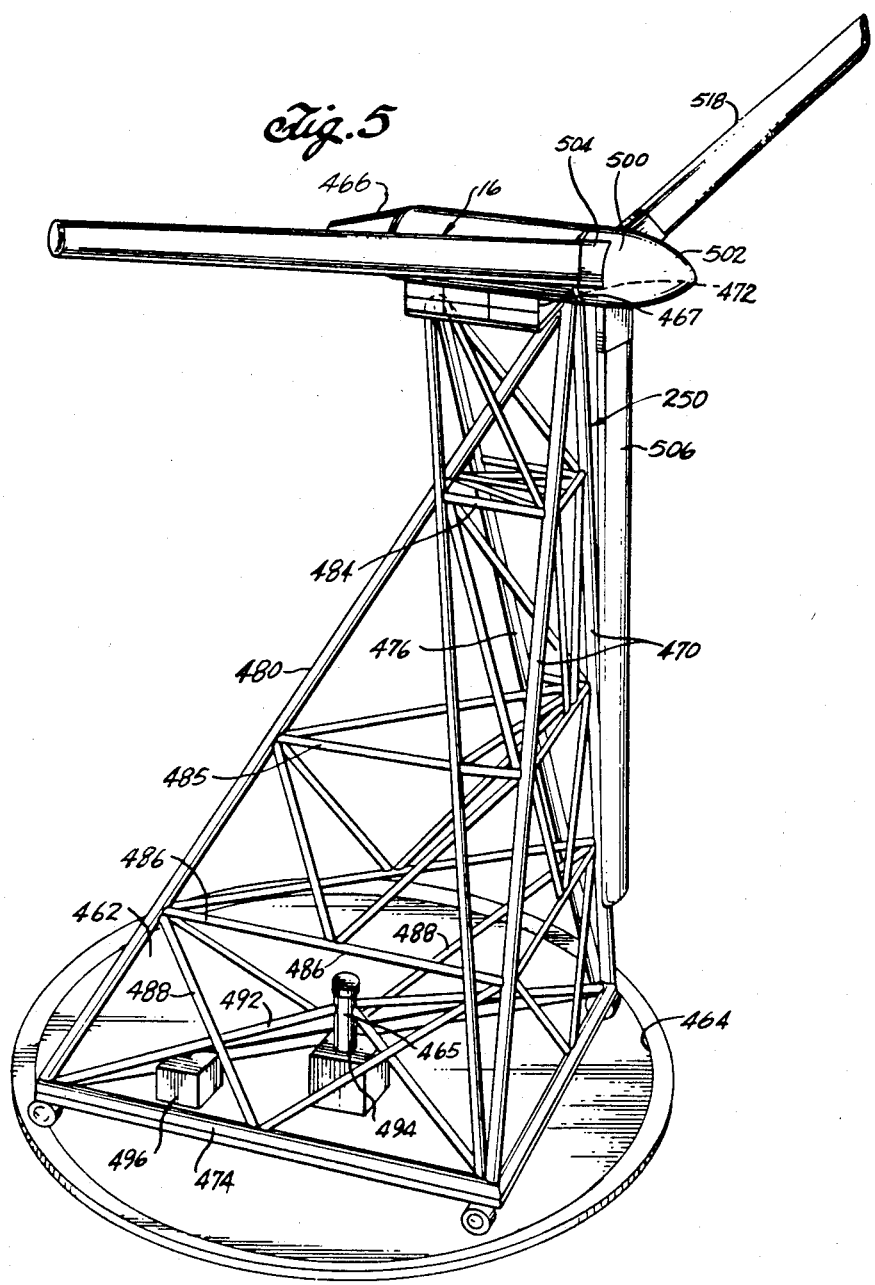

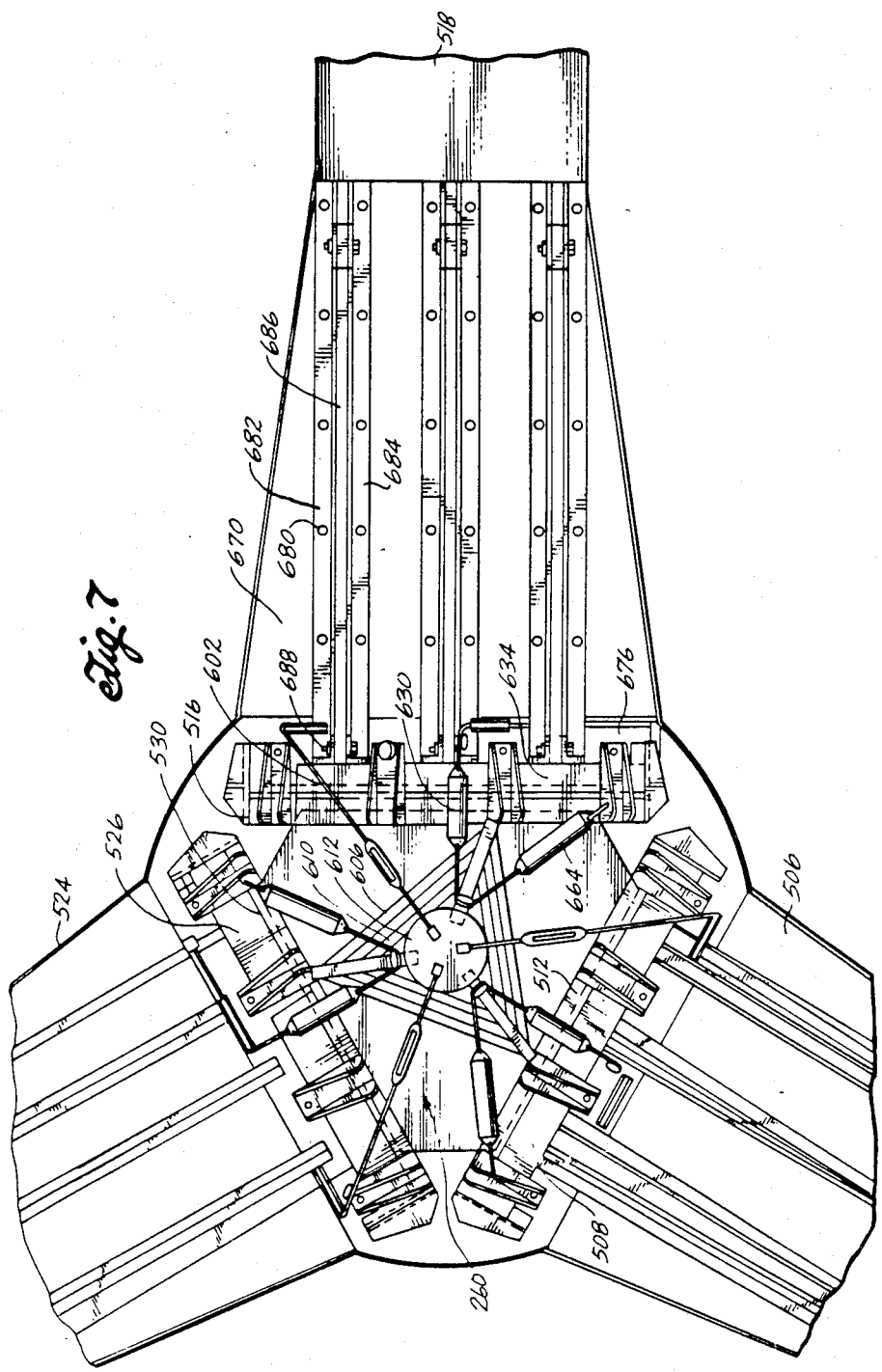

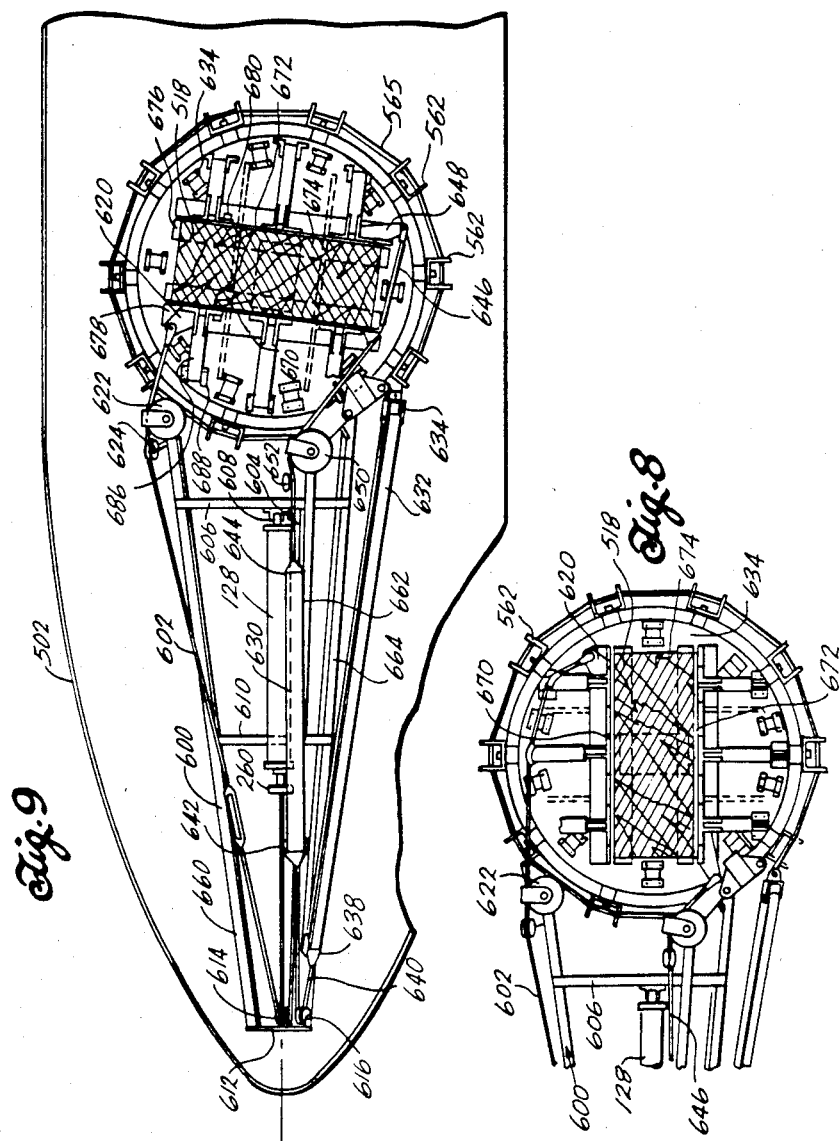

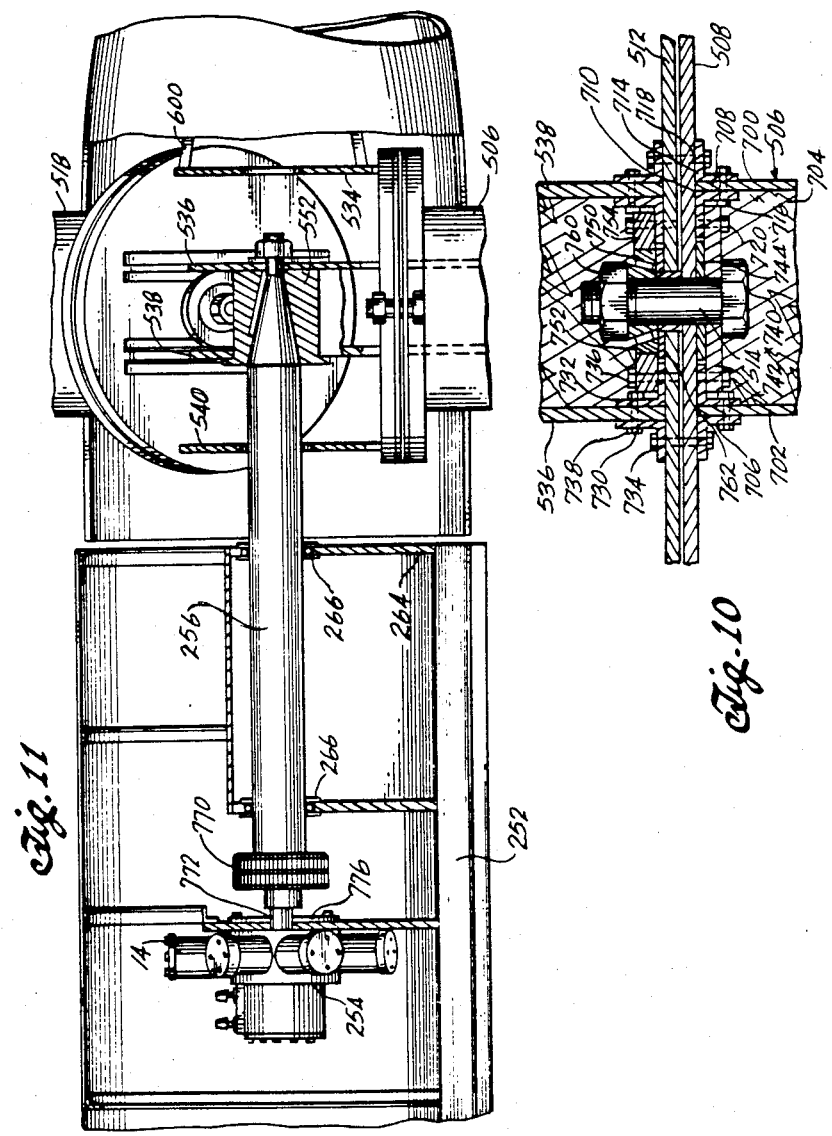

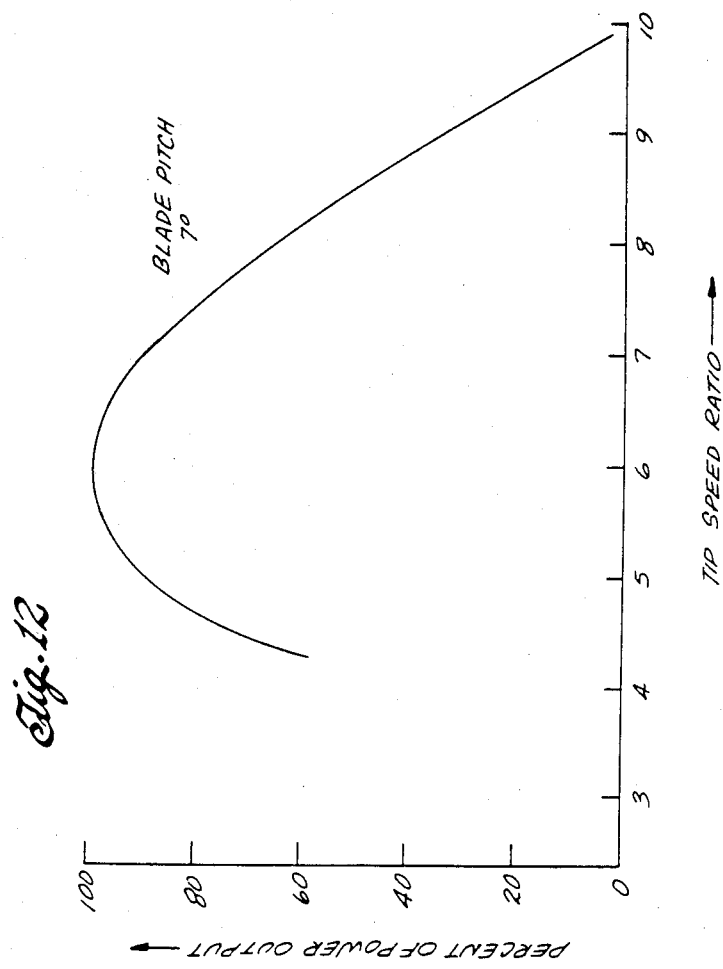

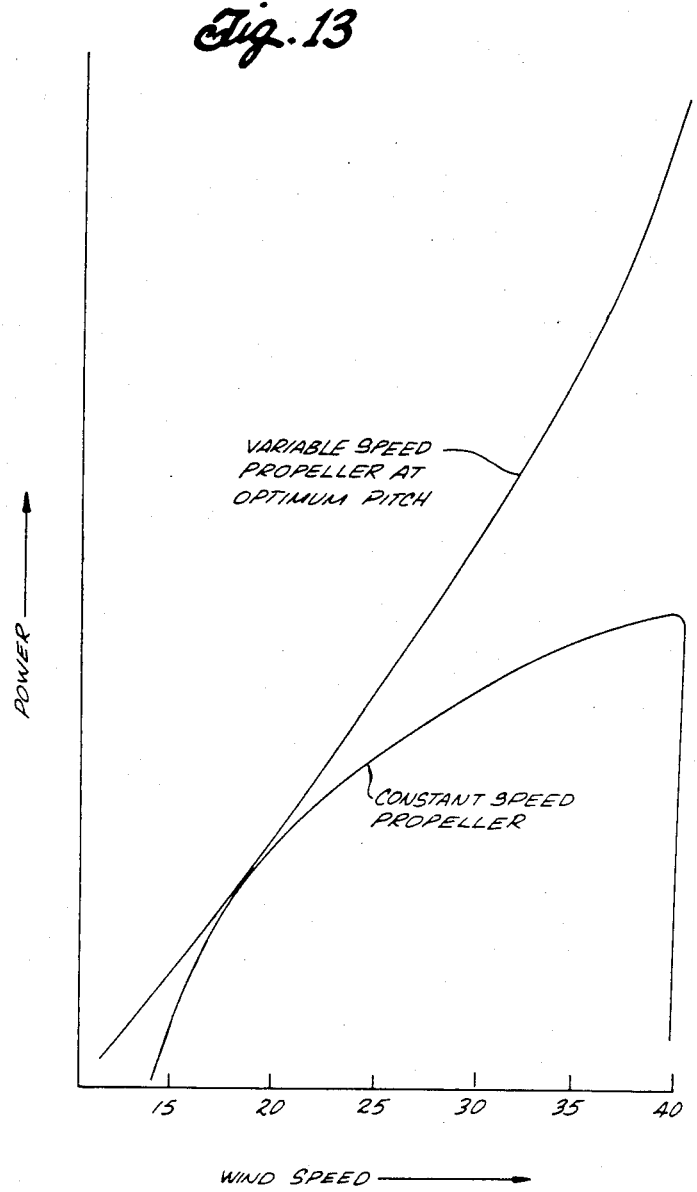

WIND POWER GENERATING SYSTEM

BACKGROUND OF THE INVENTION

The present invention relates in general to power generation devices, and, more in particular, to a wind-driven power generation device.

Windmills have been known since ancient times. These devices extract power from the wind. Usually, the power is used in driving pumps for irrigation or supplying electrical power in rural areas.

Some large scale wind turbines have been successful. One of these was the Smith-Putnam wind turbine generator built in Vermont in the early 1940's. This system had a blade span of 175 feet and produced 1.25 megawatts of electricity in a 32 mile per hour wind. The unit was abandoned upon a blade failure in favor of conventional electrical generating plants that were more cost effective at that time. With the increase in energy costs, the attractiveness of wind power has improved.

Recently consideration has been given to using wind power generators to supply electrical energy for sophisticated requirements. A host of problems, however, attend such an attempt. Wind is incredibly variable. Wind varies from geographical location to geographical location and from season to season. Some areas are blessed with a considerable amount of wind. Others are wind poor. Wind velocities and direction fluctuate broadly in short periods of time. In areas where considerable wind exists, the diurnal changes in wind velocity can vary from almost nothing to a considerable value. A mean wind speed is attendant with frequent gusts and lulls. The wind velocity varies considerably in elevation close to the ground.

The lack of constant wind from a constant direction makes power generation for electrical utility purposes seem difficult. Electrical power for utilities must be of extremely high quality. By way of example, a utility generated power must be held extremely close to 60 cycles per second. If it is not, the power is totally unsatisfactory. This means that in a wind generating system some means must exist to assure constant generator speed. Synchronous generators can obtain this end, but they must be powered by a system that supplies considerable power for all wind conditions if overall efficiencies are to be optimized. The generators cannot be permitted to devote energy either to slowing down the drive or speeding up the drive. The generators motoring the drive system can also place unusual stresses on the roots of the propeller blades.

A considerable amount of power exists in the wind at high wind speeds. The traditional approach to wind power generators, however, has been to shut down the generators above certain speeds. Shutdown was thought necessary to avoid destruction of the wind power generator by the extremely high forces produced by high winds.

The traditional approach in wind power generators operating in parallel with a utility system has been to vary blade pitch to achieve good efficiencies. These generators operate at constant propeller speed, regardless of wind speed, up to some predetermined limit of wind speed, whereupon shutdown occurs. This maintenance of propeller speed constant does not optimize the power generated. Optimization of power requires matching of the speed of the propeller with a corresponding wind velocity. Different wind speeds require different propeller speeds for optimum power.

In wind turbine generators, it is extremely important that the propeller pitch change rapidly in response to gusts of wind. One approach that has been taken in the past senses the overloads produced by gusts and generates a responsive signal. This signal operates a pitch control mechanism that feathers the propellers. The lag time in this system is substantial, some 5 seconds. To avoid this lag time, it is highly desirable that the propellers change pitch directly as a result of an overload sensed by the propellers.

Overload conditions in the past have been relieved by brakes on the generator of the wind turbine generators. The overload is sensed and the brake applied. Again the lag time is too high to assure satisfactory response to overload conditions.

Another problem attendant with previous designs is in their use of gear boxes and mechanical drive components, such as shafts and belts to transmit power from propellers to generators. Because of the speed range over which these devices must operate for effective power generation, they are susceptible to resonance. Furthermore, the drive trains of such systems become cumbersome and expensive. It is also important to avoid having too much mass above ground in order to increase tower resonant frequency and to reduce the strength and rigidity requirement of the tower.

All wind power generators have more than one propeller blade. The common approach in the past has been to feather all the blades as a unit. If one of the blades sticks when feathering is mandated, the complementary blades will not feather and the generating system could destroy itself.

It is important, also, to have a tower design that is rigid enough to reduce the amplitude of resonant vibrations of the tower, and to have a design that avoids unnecessary cyclic loads on the propeller blades. Vibration pulses occur each time a propeller blade passes the tower. For proper operation without excessive power fluctuations and large resonant exciting forces due to wind shadow on the propeller, the propeller should operate upwind of its tower. By placing the propeller upwind, tower shadowing of the blades does not occur and the resulting pulsing on the blades is eliminated. Nonetheless, even with an upwind facing propeller, the tower is cyclically excited.

Another problem with these systems occurs because of the tremendous size required for an efficient generating system. This results in extremely difficult blade design. Fatigue obviously is an important factor especially in view of the fact that the blades operate over a wide speed range and a wide loading range, both of which vary rapidly with time. Propeller systems with two blades have proven to be unsatisfactory because the substantial load required on each propeller blade to produce reasonable output results in high cyclic loads applied to the propeller blades and the tower. The fatigue problem associated with the variable speed and loading has not been adequately solved by aluminum or steel blades. Combinations of aluminum and fiberglass will not prove satisfactory either.

SUMMARY OF THE INVENTION

The present invention provides a wind power generator system characterized by its extreme sensitivity to changes in wind conditions that results in an optimization of power generated by the system while minimizing response times for required overload responses.

In a particular preferred form, the system of the present invention contemplates the matching of propeller speed with power output over a broad speed range, as is distinguished from systems which utilize constant propeller speed. Preferably, the matching corrections are smooth and without steps. The ability to match propeller speed and power results from a variable, positive displacement hydraulic motor in circuit with a driving pump. The motor drives an electrical generator. The power output of the generator varies with applied torque while generator speed remains constant. A synchronous generator ideally fits this requirement. On line, the motor operates at a constant speed because of the generator. The pump is of the positive displacement type. The displacement of the generator driving motor varies in response to the load applied by the propeller of the system to the pump so as to maintain motor speed constant and to match propeller speed with existing wind speed for optimum power. More particularly, the displacement of the motor and the flow rate through the motor have a constant ratio. For the speed of the propeller to increase, the displacement of the motor must increase to permit an increase in flow rate through the motor. Conversely, for the speed of the propeller to decrease, the displacement of the motor must decrease to reduce the flow rate in the same proportion. Means sensitive to this characteristic assure that the motor operates at the same speed and the generator is driven at a constant speed, while the propeller speeds vary to seek a speed characteristic of optimum power performance for a particular wind speed.

Preferably, the wind load response is sensed through a bridge circuit. The pressure of the hydraulic fluid is a function of the load applied to it by the propeller. This is used to generate a signal in a bridge circuit proportional to pressure. Propeller speed generates a second signal proportional to speed. The bridge circuit is calibrated by test. When the pressure increases, the displacement control responds to increase the displacement of the motor and permit greater propeller speed. The greater propeller speed will try to balance the bridge circuit. The bridge circuit responds to lower propeller speed when there is a drop in pressure.

The response of the system to varying load conditions is extremely rapid. The load applied by the wind through the propellers to the system is a direct function of the pressure in the hydraulic fluid employed in the power circuit of the system. As the wind pushes harder on the propellers with an increase in the wind, the propellers respond by applying more torque to the fluid pressurizing elements of the pump. The pump responds by increasing the pressure of the system. The response is immediate.

When the pressure in the system exceeds a predetermined limit, a pressure-sensitive device sensitive to that limit opens a dumping circuit that immediately drops the pressure in a propeller unfeathering circuit. Preferably, this elimination of the source of excess pressure is accompanied by pressure relief in the hydraulic circuit produced by means such as a valve that bypasses the generator drive motor. More specifically, the propeller blades must be loaded by an unfeathering circuit before they can achieve an unfeathered state. This circuit requires positive pressure. When that pressure is removed, the propellers instantly respond to the wind and unfeather. Under wind conditions productive of excess pressure, the propeller blades cyclically feather and unfeather with the presence and then the absence of excess pressure. Consequently, power is produced in high winds.

A preferred form of the present invention envisions the described propeller system that must be positively unfeathered by a cylinder that in turns responds to fluid pressure, preferably hydraulic pressure, generated by a source of such pressure, such as a pump. At least one normally open dump valve in hydraulic circuit with the cylinder opens to dump fluid in the cylinder into a low pressure, main hydraulic tank or reservoir, upon removal of a positive command signal. When an unfeathering signal is received, a valve completes a circuit between the high pressure source and the hydraulic cylinder and closes the valve in the dump circuit. The cylinder responds and the blades unfeather. Upon exceeding a predetermined, operating propeller speed or power limit, the dump circuit opens and the valve to the high pressure source closes. Dropping below this limit of propeller speed or power, the sequence reverses and the propeller unfeathers. The response time of the system is very rapid and the amount of feathering and unfeathering is slight once operational pressures have been achieved. It is also preferred that a safety circuit permit operation of the system at some predetermined pressure below maximum design operational pressure. For example, when maximum design operational pressure is about 4000 psi, the lower operation pressure may be about 3000 psi. Operation at this lower, upper limit results when adverse conditions exist in the system that are serious, but not critical. For example, when the temperature in the gear box for the pump becomes excessive but not critical, the system responds by operation limited to the lower maximum pressure. Thereafter, as long as the condition persists, a pressure sensor limits operation to this low pressure level by intermittently feathering the propeller.

The same type of system operates for the upper operating pressure limit. When the limit is exceeded, the fluid in the propeller actuating cylinder is bypassed.

The startup system for the generator driving motor preferably responds slowly to a startup signal, but rapidly to a shutdown signal. This may be accomplished by providing a bypass circuit around the motor. An infinitely variable valve within this circuit can be coupled to a control circuit that admits fluids slowly to an actuating device to slowly close the bypass valve. A restrictor in the actuating circuit results in the slow response. Rapid response can be obtained by a check valve and a two-position valve in circuit with the cylinder and the low pressure source of hydraulic fluid. With actuation of the two-position valve, a circuit is established between the cylinder and the reservoir of hydraulic fluid through the check valve.

Features of the present invention include a charging or makeup circuit that constantly supplies the hydraulic power circuit with fluid of sufficient quantities to match the load requirements of the system. Thus, at high load considerable fluid loss in the system can be expected, and the charging circuit will compensate for this by supplying adequate fluid.

Preferably, the motor that drives the generator has its displacement varied by a two-directional motor controlled by a two-way, three position valve. When a signal is required to increase displacement, the valve admits fluid to operate the control motor in one direction of rotation. Conversely, when a signal is received that requires displacement in the opposite sense, the direction of driving fluid to the control motor reverses.

Commensurate with low elevated mass, the motor, generator and motor displacement control, together with attendant coolers, hydraulic fluid storage tanks, charging circuitry, and the like, are mounted in the base of the system; only those components required at the hub of the propeller system are mounted above, those components including the unfeathering power cylinder, with attendant linkage, and the propeller-driven pump.

These and other features, aspects and advantages of the present invention will become more apparent from the following description, appended claims, and drawings.

BRIEF DESCRIPTION OF THE FIGURES

FIG. 1 illustrates schematically the hydraulic circuit of the wind power generating system of the present invention;

FIG. 1A illustrates a lubrication circuit of the present invention.

FIGS. 3, 3A through 3F illustrate an electrical control circuit attending the hydraulic control circuits of the first three Figures;

FIG. 5 illustrates the tower and propeller system in perspective;

FIG. 7 shows in front view the blade, hub and feathering mechanisms of the present invention;

FIG. 8 shows in an end view of one of the propeller blades fully feathered with attendant feathering mechanisms;

FIG. 9 is a view similar to FIG. 8 showing a blade fully unfeathered and a tower used to orient cables used in the feathering mechanisms;

FIG. 10 is a fragmentary sectional view illustrating a blade-to-hub connecting axle of the present invention;

FIG. 11 illustrates in side elevation, partly in section, the mounting of the torque tube, pump, and gear box on the platform of the tower of the present invention;

FIG. 12 illustrates in a plot the relationship between propeller speed, pitch and power; and FIG. 13 illustrates in a plot the relationship between power output for a wind generating machine that employs variable propeller speed and one that employs constant propeller speed.

DESCRIPTION OF THE PREFERRED EMBODIMENT

The present invention provides a unique control system for the wind driven generator of the present invention. An understanding of this circuit at the outset is fundamental and its description will be presented first.

Figure 2:
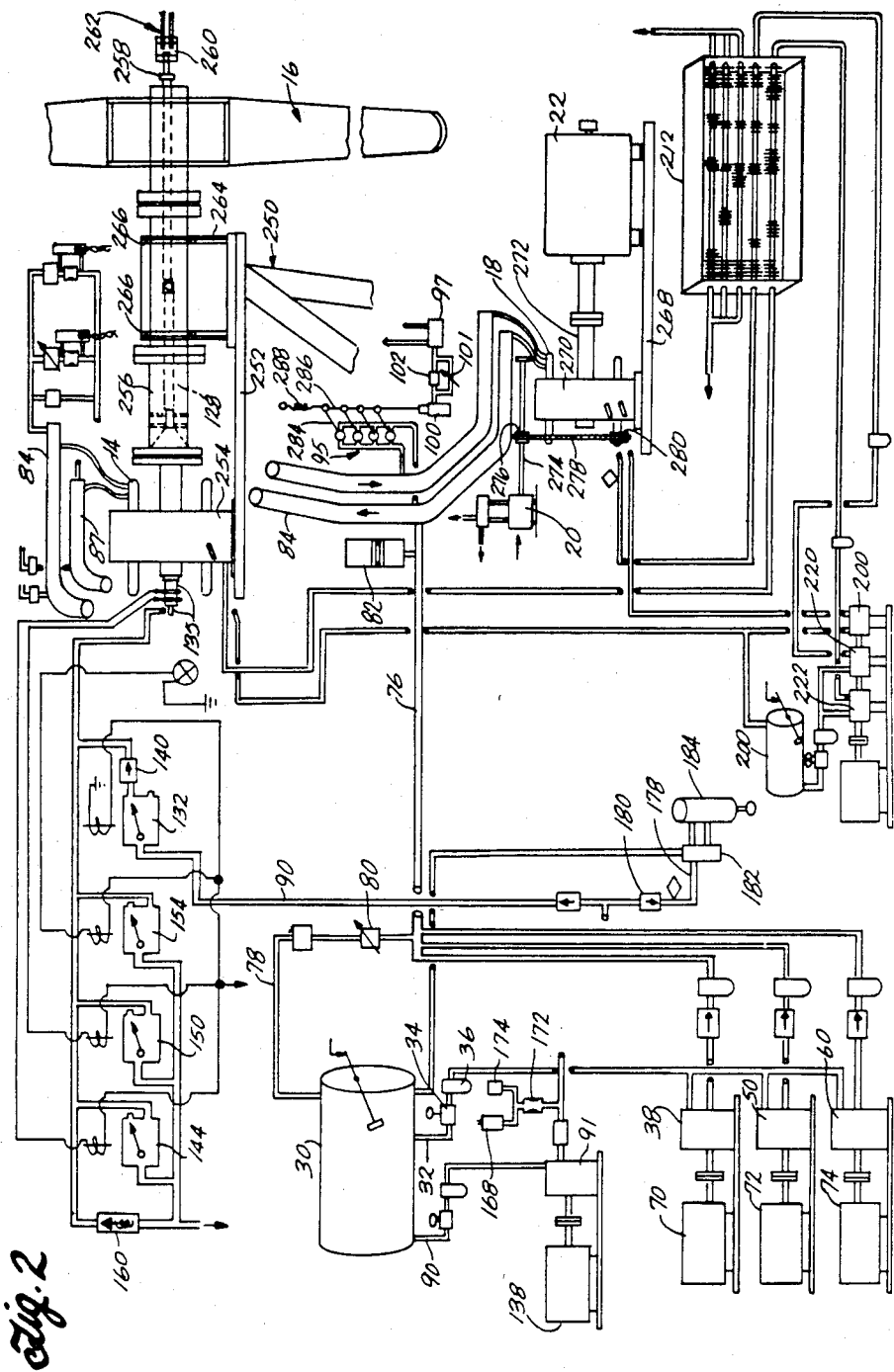
FIG. 2 complements FIGS. 1 and 1A in the showing of most of the hydraulic circuit elements of that Figure together with attendant components.

FIGS. 1, 1A, and 2 both show the hydraulic circuit of the present invention. The Figures are somewhat repetitive, but both aid in their own way in an understanding of the circuit.

Wind generators are subject to a horrible environment. The wind periodically shifts direction. The wind always is increasing or decreasing in intensity. The wind is not the same at any instant of time across the span of the blades of the machine.

These problems, presented only in broad outline, result in the enjoyment of only seemingly erratic performance by a wind machine generating electrical power. This is more so especially in view of the fact that the power must be of high quality with a fixed cycle rate. The latter characteristic can be obtained with a synchronous generator. The generator must be driven at a constant speed, say 1200 rpm, for example. The propeller of the wind machine of this invention does not revolve at a constant multiple of generator revolution rate.

The present invention envisions a wind driven propeller that is controlled to a predetermined rotational speed that is a function of wind speed until a predetermined maximum speed of, say, 40 miles per hour is attained. Prior to maximum speed, the propeller has a unique speed for each wind speed. Thereafter, in marked distinction from most of the efforts in the past, the propeller rotates at a constant speed by feathering just enough to dump off excessive wind, while still generating maximum power.

Broadly, after the propeller faces into the wind, a system permits the propeller to drive a hydraulic pump, or a series of hydraulic pumps, that energizes a working fluid. This working fluid drives a hydraulic motor that is coupled directly to the synchronous generator. The hydraulic motor is a variable displacement, positive displacement type. The flow rate of fluid through the generator driving motor is related to the displacement of the motor so that the displacement divided by the flow rate, or the inverse, is maintained sensibly constant when the load of the generator maintains the speed of the hydraulic motor constant. But the generator should not be used to maintain motor speed constant except within narrow limits, because to do so would result in unacceptable inefficiencies in the motor at constant speed. By varying the displacement of the motor, the flow rate of the fluid through the motor varies proportionately. This fact is used to get maximum possible power from the propeller blades over a broad speed range by permitting the propeller blades to operate at optimum speed.

Of course, various overload conditions must be monitored to prevent the system from destroying itself. The hydraulic circuit of the present invention accomplishes the sensing and response to overload in an extremely fascile manner, so that very little lag exists between an overload signal and a response of the propellers to a feathering signal. Generally there are two levels of overload sensing. A first, high pressure level corresponds generally to the maximum rated load of the system, which occurs at some prescribed wind speed, say, 40 miles per hour, for example. The system of the present invention feathers the propeller blades so that a maximum pressure in the hydraulic system is never exceeded. Thus during wind gusts or high wind conditions the propeller blades are constantly being feathered to dump wind and to maintain the high pressure limit in the hydraulic system, and at no greater pressure. A lower pressure limit responds to certain potential dangers which, though present, are not critical. An example would be a slightly high synchronous generator temperature.

The system works by the propeller blades being normally in the fully feathered state. Thus power must be applied to unfeather the propeller blades and have them respond to the wind. In the event of a signal requiring feathering, the power of the system is either reduced by low pressure operation in response to some stimulus such as excessive generator temperature, or turned off completely in response to some clandestine event, such as exceeding an upper limit of generator temperature, or goes on at maximum power and high pressure, but with the dumping of fluid to a reservoir so that maximum power is not exceeded.

With reference now to the drawings, the circuit elements will first be described and then their operation will be described.

With reference to FIG. 1, a charging pump circuit 10 pressurizes the main hydraulic circuit at the outset of operation and assures a sufficient amount of hydraulic fluid in that circuit to account for any losses during operation. These losses include hydraulic fluid loss across pistons of the pumps and motors of the entire circuit. A power circuit 12 utilizes the hydraulic fluid from circuit 10. The power circuit includes a pump 14 driven by a propeller system 16 of the apparatus. The propeller system includes three propeller blades. A motor 18 is driven by the output of pump 14. The displacement of motor 18 is determined by a control motor 20. Motor 18 drives a synchronous generator 22. A bypass circuit 24 bypasses pump 14, at least to some extent, when excessive pressure exists within the hydraulic system, or some danger signal exists. Feathering circuit 26 is responsible for unfeathering propeller system 16 when conditions require. Still a further circuit is a lubrication circuit 28.

A closed main hydraulic tank or reservoir 30 provides the hydraulic fluid for the system. A line 32 feeds charging circuit 10 from the main hydraulic tank. An on off valve 34 and a filter 36 in line 32 permit the isolation of the hydraulic tank from the charging circuit and prevent particulates from entering the circuit.

Charging circuit 10 includes a bank of three parallel pumps. A pump 38 feeds from a branch line 40 from line 32 and discharges through a line 42 to a charging circuit outlet line 44. A check valve 46 in line 42 prevents backflow through the line towards pump 38. A strainer 48 in line 42 avoids discharge of particulates into line 44. A second pump 50 of the charging pump bank connects into line 32 through a branch line 52 and discharges into a line 54. Line 54 tees into line 44 and contains a backflow preventing check valve 56 and a strainer 58. A third charging pump 60 of the bank of pumps receives inlet fluid directly from line 32, and discharges fluid into line 62, and through a check valve 64 and a strainer 68, into line 44. The check valve again prevents backflow from line 44 into the outlet of the pump. Pumps 38, 50 and 60 are driven, respectively, by electrical motors 70, 72 and 74.

In operation of the charging circuit, pump 38 runs all of the time to provide circuit 12 with hydraulic fluid. In the event that pump 38 is not up to the task, controls so indicate, and pump 50 goes on line to augment the output of pump 38. Then pumps 38 and 50 both provide hydraulic fluid from main hydraulic tank 30 to circuit 12. Pump 60 comes on line in response to a control indicating inadequate power fluid to circuit 12, which normally occurs in the high power range of the system.

Line 44 feeds an inlet line 76 for circuit 12. A line 78 from line 44 returns flow to the main hydraulic tank 30 through a pressure relief valve 80. When the pressure in line 44 becomes excessive, relief valve 80 will open to dump hydraulic fluid back into the main hydraulic tank.

An accumulator 82 may tee into line 76 to smooth out pressure surges.

Power circuit 12 is supplied hydraulic fluid as required from charging circuit 10 through line 76. Line 76 joins a line 84 that provides the input to pump 14. A line 85 from the outlet of motor 18 also joins line 84. The discharge from pump 14 goes into a line 86 that joins a line 87 that in turn forms the inlet for motor 18. A bypass line 88 between lines 87 and 85 permits the bypassing of motor 18. Thus, a loop circuit exists between the inlets and outlets of pump 14 and motor 18 with the possibility of makeup fluid entering the loop through line 76.

Motor 18 is a variable displacement motor, the displacement of which is controlled by control motor 20. Control motor 20 is in circuit with main hydraulic tank 30 through a line 89. Line 89 tees into a line 90 that emanates from a high pressure pump 91. High pressure pump 91 is in series with main hydraulic tank 30. A check valve 92 in line 89 prevents back flow through the line towards line 90. A three-position, four-way valve 93 in line 89 determines the flow of hydraulic fluid to control motor 20. An outlet line 94 from motor 20 leads to main hydraulic tank 30 through valve 93. Three-position, four-way valve 93 is in normal position with its internal ports blocked so that no flow through control motor 20 occurs. When the upper solenoid is actuated, line 89 communicates with motor 20 and the motor will turn in one direction, say clockwise. Alternatively, when the bottom solenoid is actuated, the flow of hydraulic fluid to motor 20 goes into the opposite port, and the motor is driven in the opposite direction, say counterclockwise. Regardless of the direction the motor rotates, motor discharge is to the main hydraulic tank.

Motor 18 is of the swash plate type having a plurality of pistons coupled to the plate. With tilting of the plate the displacement of the pistons in cylinders or chambers with each revolution of the motor changes. In a neutral position of the swash plate, no displacement at all occurs.

As will subsequently become apparent, the propeller transmits the power of the wind through pump 14 to the hydraulic fluid in the pump circuit. The greater the force of the wind, the greater the pressure of the hydraulic fluid for a given pump speed. Pump speed and propeller speed are controlled by the flow rate of fluid through motor 18, the faster the flow rate, the faster the propeller is permitted to turn; conversely, a propeller speed for optimum power for a particular propeller design exists for each wind speed. This optimum speed may be viewed as an optimization of propeller efficiency. The present invention provides a means for operating the propeller at the optimum speed, or efficiency, for each wind speed. As will be explained subsequently, as the hydraulic fluid pressure in the hydraulic circuit changes in response to differences in the wind force on propeller 16, a transducer senses the change. This transducer controls a potentiometer in a bridge circuit that controls the operation of the solenoids of valve 93. A speed sensing transducer controls a second potentiometer in the bridge circuit. With an increase in pressure, the bridge circuit responds by opening the valve to operate driving motor 18 in a rotational sense that increases the displacement of motor 18. This reduces the resistance to propeller rotation, the propeller will speed up, and the pressure in the circuit will drop. Eventually a balance will be reached between propeller speed and system pressure. System pressure and propeller speed correlations are empirical and must be established for each specific design. The specific electrical circuit will be discussed in the context of FIGS. 3 through 3F.

Generator 22 is a synchronous generator. The effect of the load of synchronous generator 22 on motor 18 is to maintain the rotational speed of the motor constant when the generator is connected in normal operation to a utility power system. Unless propeller system 16 is turning at a predetermined threshold speed corresponding to minimum power production, the discharge of pump 14 in line 87 shunts motor 18 by passing through line 88. A normally closed, infinitely adjustable valve 95 in line 88 controls the flow of fluid through the line. Valve 95, in turn, is controlled by a bypass control circuit 96. A two-position, four-way valve 97 is normally closed to line 76, but communicates with this supply line through a branch line 98. A line 99 between valve 97 and a cylinder 100 communicates the cylinder with a source of hydraulic fluid when valve 97 permits. A variable restrictor 101 in line 99 slows the response of cylinder 100 to line pressure by making the buildup of pressure in the cylinder gradual. Valve 95 couples to a movable piston in cylinder 100 through positive linkage and will open correspondingly at a slow rate. A check valve 102 in a line 103 bypasses restrictor 101 and permits fluid to flow from cylinder 100 back into hydraulic tank 30 when valve 97 is open to the tank. When valve 97 opens line 99 to tank 30, cylinder 100 empties rapidly with a corresponding rapid opening of valve 95. Motor 18 is then out of circuit.

Bypass circuit 24 responds to limit the pressure within power circuit 12. A relief valve 104 in circuit with the inlet of pump 14 functions to dump excessive pressure on the outlet side of the pump by shunting across motor 18. Relief valve 104 is in circuit with the inlet of pump 14 through a line 105 that ties into inlet line 84 to pump 14 and a branch line 106 in which relief valve 104 is disposed. The inlet of valve 104 is in circuit with the discharge of pump 14 through a line 107. Relief valve 104 empties into branch line 106.

When the production pressure of pump 14 is below an excessive level, but is approaching that level, a relief valve 110 shunts fluid across motor 18. Relief valve 110 is in circuit with line 107 through a branch line 111 that discharges into line 105. A parallel circuit of a pressure switch 114 and a restrictor 112 functions to indicate a high pressure signal to feathering circuit 26 for the feathering of the propellers when pressure switch 114 is energized. Restrictor 112 is in line 111. This will be described in greater detail subsequently. Restrictor 112 limits the rate of discharge through valve 110 and results in switch 114 operating in a narrow range of pressures. An intermediate relief valve 116 operates at a lower pressure than valve 110 to relieve the pressure in circuit 12. Valve 116 is in line 105 upstream of lines 106 and 111. Valve 116 opens at some predetermined lower pressure than the pressure required to open valve 111. A restrictor 118 in line 105 is in series with valve 116 downstream thereof. A pressure switch 120 across restrictor 118 again signals the feathering circuit to feather the blades of the propellers. Restrictor 118 attenuates the rate of discharge through the valve, and results in operation in a narrow band. Restrictions 112, and 118, and pressure relief valves 110 and 116 can be dispensed with if pressure switches 114 and 120 are sufficiently responsive.

Thus, overload circuit 24 has three parallel relief valves. One, valve 104, relieves the circuit of excessive pressure. The second, valve 110, relieves the circuit when the pressure in the circuit has not reached the value relieved by valve 104, but is still excessive. The third, valve 116, relieves the circuit at still a lower pressure. Valve 110 relieves the circuit by opening switch 114, which immediately feathers the propeller blades. Valve 116 maintains a reduced operating pressure by closing switch 120 at the lower pressure, and when other dangerous but not critical conditions exist. So long as these dangerous but not critical conditions exist, valve 116 will cycle to limit the pressure in the circuit. As the pressure builds up, the valve relieves it. Upon relief, the pressure is below the triggering pressure for valve 116 and the valve is closed. The pressure can then build up again until valve 116 opens.

Feathering circuit 26 ties into bypass circuit 24. The function of feathering circuit 26 is to unfeather propeller blades 16 to the extent necessary to maintain desired pressure within the power circuit. The propeller blades are normally in a fully feathered condition. Positive signals must be received to unfeather the propeller blades.

In general, the feathering circuit includes a cylinder 128 that has a piston which through a linkage system 130 is capable of unfeathering blades of propellers 16. Pressurizing the cylinder unfeathers the blades of the propeller. Reducing the pressure in the cylinder increases feathering. A two-position valve 132 in a line 134 admits fluid to cylinder 128, when a solenoid of valve 132 is energized. Valve 132 is in line 90 downstream of high pressure pump 91. A hydraulic slip coupling 135 in line 134 permits hydraulic cylinder 128 to be located along the axis of a torque tube of the propeller and to rotate with the propeller. High pressure charging pump 91, powered by an electric motor 138, raises the pressure of fluid in line 90 to a substantial level, say about 3,000 psi. A check valve 140 downstream of valve 132 and in line 90 prevents backflow through the valve and downstream into the line. A bank of solenoid-operated control valves 142 in circuit with line 134 function to dump out fluid from cylinder 128 in response to an overload condition, and thereby feather to an extent propeller blades 16. A first of these valves 144 in a line 146 is in series circuit between valve 132 and main hydraulic tank 30 through a distributor line 148. Line 148 ties into line 90 downstream of check valve 140 and upstream of cylinder 128. A second solenoid-operated valve 150 parallels valve 144. Valve 150 is in a branch line 152 that is in circuit with line 148 and line 146. A third solenoid valve 154 in a line 156 parallels solenoid valves 144 and 150. Line 156 is in circuit with lines 148 and 90. A line 158 parallels valves 144, 150 and 154 between valves 132 and main hydraulic tank 30. A pressure relief valve 160 in line 158 prevents propeller blade overloads due to wind gusts by dumping fluid in cylinder 128 into tank 30. Line 158 is in pressure communication with cylinder 128 through lines 148 and 134. As will become subsequently apparent, the propeller blades are pivotally mounted on a hub so that the blades can feather. Wind in the blades tends to rotate the blades towards feather and increases the pressure within cylinder 128. The pressure is immediately sensed by valve 160. When the pressure is excessive, valve 160 relieves the pressure. The over-pressure in cylinder 128 drops with the opening of valve 160.

With the drop in pressure in cylinder 128, the propellers feather enough to compensate for the gusts.

In general, circuit 26 operates to leak the pressure in cylinder 128 by opening valves 144, 150, and 154 in response to some predetermined stimulus. For example, when excessive pressure is reached as sensed by switch 114, a feathering signal results from the operation of switch 114 to relieve the pressure in cylinder 128 by dumping fluid through the solenoid valves and into hydraulic tank 30. The propellers feather in response to the lower pressure in cylinder 128. This circuitry will be described subsequently.

Line 90 has a shutoff valve 162 in it. A filter 164 downstream of shutoff valve 162 and in line 90 filters out undesirable particulate matter. A check valve 166 in line 90 prevents a backflow towards charging pump 91. An accumulator 168 ties into line 90 through branch line 170 and a restrictor 172. A pressure switch 174 is in circuit with accumulator 168. Both the accumulator and the pressure switch are downstream from restrictor 172. Restrictor 172 attenuates or slows the time response of pressure switch 174. Pressure control switch 174 downstream of restrictor 172 senses the discharge pressure of pump 91. The slowing of the response of accumulator 168 by restrictor 172 prevents pressure switch 174 from cycling too rapidly.

A tower turning circuit 176 is supplied by fluid from charging pump 91 and ties into line 90 by a line 178. A check valve 180 in line 178 prevents backflow through line 178 towards line 90. A three-position, double solenoid-operated, four-way valve 182 controls the flow of fluid to a tower turning motor 184. Tower turning motor 184 is in circuit with line 178 and with main hydraulic tank 30, the latter through a discharge line 186. Actuation of valve 182 by the right solenoid establishes a circuit to motor 184 that turns the motor in one direction, say clockwise, for a corresponding rotation of the tower. Actuation of the left solenoid reverses the flow of power fluid to motor 184 resulting in rotation of that motor in the opposite direction, say counterclockwise for a corresponding rotation of the tower.

Circuit 28 is the lubrication circuit. A gear box oil tank 200 receives oil from a crankcase 202 of propeller driven pump 14 by gravity through a discharge line 204 and that ties into a line 206. Crankcase 205 of generator drive motor 18 discharges into line 206 with the aid of a pump 208 in the line. A line 210 supplies oil to the pump and motor crankcases. A heat exchanger 212 cools the oil in line 210 prior to its introduction into the pump and motor crankcases. A line 214 parallels line 210. A shut-off valve 216 is in line 214. A coarse filter 218 in line 214 keeps particulates from passing into downstream pumps. Parallel pumps 220 and 222 in branch lines 224 and 226 are fed by line 214 and provide oil to the generator motor gear boxes and propeller pump gear boxes, respectively, under pressure. Prior to the introduction of oil to these gear boxes, the oil is cooled in heat exchanger 212. Fine filters 228 and 230 in lines 226 and 224, respectively, filter out the particulates.

The hydraulic circuit functions as follows:

Charging circuit 10 brings hydraulic fluid from tank 30 up to desired charging pressure by the operation of pumps 38, 50, and 60. The number of pumps on line is determined by the amount of fluid required to maintain the desired charging pressure, which may be, for example, 300 psig. Pump 38 runs all the time. Pump 50 supplements pump 38 at intermediate power. Pump 60 supplements the other two pumps in the high power range of the system. Excess pressure is relieved through relief valve 80.

The pressurized hydraulic fluid from circuit 10 enters the power generation circuit 12 through line 76 and enters the chambers of pump 14, which may in practice be a plurality of individual pumps, to force the free pistons of the pump to their bottom positions and fill the chambers of the pumps. Pump 14 is capable of going on line when the pressure in the pump inlet is high enough, an event that can be determined by pressure switches. How the pump integrates with the balance of the power circuit will be described subsequently.

The tower is positioned to face the propellers into the wind by motor 184. Fluid for driving this motor comes from high pressure pump 91. Pressure switch 174 determines whether the pressure in high pressure supply line 90 is adequate. If there is sufficient pressure, motor 184 can operate.

Upon a command signal, one of the solenoids of valve 182 energizes to direct fluid into one port or the other of motor 184, depending on the required direction of rotation. The return flow goes back through the valve and into main hydraulic tank 30. The command signal is "left" or "right" and comes from a weather vane controlled switch that will be described subsequently.

The propeller feathering circuit is also energized by pump 91. Valve 132 opens in response to a startup signal and allows high pressure fluid to go into hydraulic cylinder 128 to unfeather the propeller blades. This same signal energizes the solenoids of valves 144, 150, and 154 and closes these valves to prevent feathering. When feathering is required, a drop-out signal deenergizes the solenoids of valves 132, 144, 150, and 154. Fluid then flows back from cylinder 128 and through valves 144, 150, and 154 to main hydraulic tank 30. The dropout signal also closes valve 132 to prevent fluid from entering cylinder 128 from the high pressure pump. The three parallel valves work individually to control propeller overspeed, or generator overspeed. This will be explained later. However, in normal operation the valves work jointly by unfeathering the propeller when on and feathering the propeller when off.

Power circuit 12 must accommodate the fluctuations in wind intensity at the site of the system. Motor 18 is a variable positive displacement motor. Propellers 16 turn at varying speeds depending on wind intensity. Control motor 20 rotates the displacement control of motor 18 one way or the other to vary the flow rate through motor 18. Motor 18 will operate at constant speed because generator 22 runs at a constant speed when it is connected to a utility system, the generator being synchronous. Therefore, when the displacement of motor 18 increases, it will allow the propeller to turn at a faster speed because the flow rate of fluid through the motor increases. Conversely, when the displacement of motor 18 decreases, the propeller will turn at a slower speed because the flow rate through the motor is lower. The displacement of motor 18 varies in response to control motor 20 and a command signal determined by the load on the system. Because the system is hydraulic and of positive displacement, variations in system loading result in proportional variations in system pressure. The speed of the propeller and the system pressure can therefore be related. As will be discussed, this relationship is established through a bridge circuit. The circuit adjusts the displacement of motor 18 in a manner that permits propeller rotational speed to seek a value at which power is optimized.

The system reduces power when the temperature or pressure of any part of the system increases beyond limits. Power reduction occurs through relief valves 110 and 116. Valve 110 relieves at a higher pressure than valve 116. For example, valve 110 may relieve at 4000 psi and valve 116 may relieve at 3000 psi. When fluid passes through restrictors 112 and 118, pressure differentials exist across them and pressure switches 114 and 120 open. The upper pressure limit is the normal operating pressure of the system. When the pressure gets above the upper limit, the fluid will dump from the high pressure side of pump 14 through relief valve 110 and restrictor 112. As stated, the contacts of pressure switch 114 open at this time. Switch 114 controls the solenoids of valves 132, 144, 150, and 154. Valve 132 closes. The other three valves open, allowing the pressurized fluid in cylinder 128 to discharge into the main hydraulic tank 30 The propeller then feathers to a point where the overpressure disappears. At this time, valve 110 closes, and switch 116 closes. With the closing of switch 116, valve 132 opens, and valves 144, 155, and 154 close. Propeller 16 then unfeathers and returns to its operating position. This series of events repeats itself so long as the wind is above some maximum value, say 40 miles per hour.

When an excessive temperature, pressure, or other dangerous but not critical condition appears (primarily due to heat), power production reduces. The troublesome condition is sensed in a manner to be describad. With the sensing, the feathering control circuit responds by closing valve 132 and opening valves 144, 150, and 154. Fluid in cylinder 128 then flows back into tank 30 and the blades of propeller 16 feather to the point where pressure switch 120 closes, reestablishing the hydraulic circuit to cylinder 128 from the high pressure pump by opening valve 132 and closing valves 144, 150, and 154. The system will then cycle on and off to maintain the lower pressure by cycling switch 120 on and off. When the undesirable condition relieves itself, switch 120 will be taken out of circuit. The propeller then will be allowed to speed up and the pressure can go to its maximum limit. At this time, valve 110 opens, and switch 114 responds as before, and the blade feather cycle maintains maximum power.

Centrifugal switches in the blade tips are calibrated to open the hydraulic circuit between cylinder 128 and tank 30 at some predetermined speed, say about 43 revolutions per minute (rpm). A switch for each of at least two of the blades provides a desired redundancy. The overspeed sensors are coupled to valves 150 and 154, and they momentarily release hydraulic fluid to give a small amount of feathering, which decreases the speed of the blades. Again, cycling back and forth is normal and to be expected.

What has just been described relates primarily to on-line operation after startup. Startup occurs as follows.

Upon receiving a startup signal, which is initiated by the wind attaining some predetermined speed, say 12 miles per hour, power is established to the electrical controls. Power is then supplied to motors 70 and 138 of pumps 38 and 91. Pump 91 brings the pressure upstream of the feathering circuit and the tower rotation circuit up to operational level. Pump 38 provides pressure in power circuit 12 for proper operation as the propeller blades unfeather and gather speed. A wind sensor determines which direction the tower is in relation to the wind. It will send a "left" or "right" signal to four-way valve 182. Hydraulic motor 184 will then be in circuit and turn the tower left or right to face it into the wind. When the tower faces into the wind, motor 184 stops. A signal will then be sent to feathering circuit 26 to close valves 144, 150, and 154, and open valve 132. The propeller unfeathers at a predetermined rate.

The propeller eventually reaches a threshold speed. The threshold speed corresponds to minimum operational speed. Prior to obtaining the threshold speed, pump 14 pumps fluid around the power circuit through bypass line 88. Motor 18 is out of circuit at this time because a pressure differential does not exist across it.

Upon the occurrence of the threshold signal that the propeller is turning at the predetermined speed, valve 97 will open to close bypass valve 95 and allow pressure to build up across motor 18. Valve 95 opens slowly to avoid pressure surges. When sufficient pressure across motor 18 exists, it starts and turns generator 22. The slow opening of valve 97 occurs as follows. When valve 97 opens, fluid goes slowly through variable restrictor 101 and into cylinder 100. The piston in cylinder 100 responds slowly. The linkage between valve 95 and the piston of cylinder 100 opens valve 95 slowly.

Initially, motor 18 is set at its maximum displacement. When valve 95 is fully closed, motor 18 will not be driving generator 22 at synchronous speed. At this time the motor will turn the generator at a slower speed. Control motor 20, through signals from the control system, will decrease the displacement of motor 18. This increases the speed of the motor. When the generator reaches a predetermined speed of, say, 1150 rpm, the generator goes on line. The generator then motors to synchronous speed of, say, 1200 rpm. The field switch of the generator will then close which will allow the generator to go into a loading mode and start putting power into a utility grid.

When the generator locks on the line, the control system determines if the propeller is generating the required power for a particular speed of the propeller. If there is not a match between power and propeller speed, and this will inevitably be true upon startup, displacement control motor 20 will continue to progressively decrease displacement of motor 18 to speed up the generator.

Just before locking on the line, the propeller freewheels at a speed greater than loaded speed. When the generator locks on line, the propeller is loaded, but its speed is still too high. Displacement control motor 20 has to decrease the displacement of motor 18 in order to allow the propeller to slow down to optimum and operational speed, usually about two thirds of unloaded speed. Since the manifestation of power generation by the propeller is in the pressure of the output fluid from pump 14, when the propeller speed is in excess of optimum motor speed, there is insufficient hydraulic pressure. The displacement of motor 18 decreases to raise the hydraulic pressure towards optimum. When the pressure in the power circuit increases, the propeller slows down in response to the load. When the propeller speed matches the optimum pressure for that speed, the displacement control will stop turning and allow the propeller to generate what power it will, which will be optimum for that wind speed.

Assuming an increase in the wind, the propeller will not respond immediately by turning at a faster optimum speed, because the displacement of motor 18 remains constant and brakes the propeller. But the pressure in the power circuit increases, because the propeller provides more torque. The control system sees that the pressure is higher than what it should be for optimum power at existing propeller speed. It increases the displacement of motor 18, which allows the pressure to drop and the propeller to increase in speed. The propeller continues to increase in speed until the propeller speed matches a predetermined pressure in the power circuit for that speed.

Assuming that the wind dies down, the propeller will not initially respond because its speed is uniquely determined by the displacement of motor 18, assuming sufficient wind. The pressure in the power circuit will drop. The speed and pressure no longer match a predetermined optimum. The displacement of motor 18 decreases, which increases the pressure. The higher load slows the propeller down to where the pressure and propeller speed reach a new matching optimum.

When the wind dies down and with the displacement control changing propeller speed, at some point the generator will fail to put out power. At this time, the line contactor opens, and bypass valve 95 is snapped open rapidly so that the inertia of the generator armature does not motor the propeller. More specifically, fluid leaves cylinder 100 rapidly through check valve 102 to tank 30. Valve 95 quickly opens. Motor 18 and generator 22 will rapidly stop, taking the load off the propeller and not motoring it. If the generator and motor were in circuit, motoring of the propeller could take place by a reverse pressure across pump 14, causing the latter to act as a motor. The propeller freewheels and fluid circulates through bypass valve 95 when the motor and generator are out of circuit. The propeller continues to motor until the wind increases and the sequence repeats itself.

When the propeller stops rotating completely due to a lack of wind, the blades feather through signals from the control circuit terminating power to valves 132, 144, 150, and 154, thus preventing fluid from entering hydraulic cylinder 128 and allowing fluid trapped at the time of unfeathering to be returned to tank 30 through valves 144, 150, and 154.

FIG. 2 illustrates much of what was shown in FIG. 1 but in less abstract form. A complete description of the Figure will not be presented, because such a description would be redundant. But portions of the Figure which illustrate either structure not expressly called out earlier, or called out only abstractly, will be described.

A tower 250 supports a platform 252 that mounts a gear box 254. Gear box 254 couples the propeller system 16 to pump 14. A torque tube 256 from propeller system 16 to the gear box ties the propeller system and the gear box together. Feathering cylinder 128, which may be disposed within torque tube 256, has a power shaft 258 that extends out to a block 260. Block 260 anchors the ends of the feather control cables 262. A pedestal 264 supports torque tube 256 above platform 252. Bearings 266 journal the torque tube in the pedestal.

As previously discussed, pump 14 may be constituted of a plurality of pumps. That plurality is shown in FIG. 2, each individual pump being tied into gear box 254.

Generator 22, motor 18, and control motor 20 all mount at the base of the tower and on an appropriate platform. Clearly this reduces the mass that must be supported by the tower. Generator 22 couples to motor 18 through a gear box 270 by a torque tube 272. Again, motor 18 may be a plurality of motors, individual members of which tie directly into the gear box. Motor 20 controls the position of swash plates within motors 18 as through a sprocket and chain arrangement. Thus, motor 20 has an output shaft 274 that mounts sprockets 276 that drive chains 278. Chains 278 in turn drive sprockets (not shown) of the motors. In the Figure, an idler sprocket 280 is shown.

Because of the large sizes involved, it may be necessary to use a number of small components plumbed in parallel. This has been alluded to for the case of pumps 14 and motors 18. It can be seen again in the case of valve 95. Valve 95 may be constituted of a bank of ball valves, say four in number, plumbed in parallel. Levers 284 from each valve pivotally connect to an actuating shaft 286. The shaft is biased into a position corresponding to an open position of valve 95, as by a spring 288. Shaft 286 pivotally couples to the power shaft of cylinder 100.

FIG. 3 schematically depicts the electrical controls of the circuit shown in FIGS. 1 and 2.

A tower rotation circuit 176 responds to wind direction through a weather vane 300. The weather vane controls a switch 302. The switch has two alternate poles and a ground. A switching element of the switch is in circuit with the ground. The weather vane is located on the tower. When the propeller on the tower is not facing in the direction of the wind, and there is a wind, the weather vane will be against one or the other of opposite limit stops. A neutral position corresponding to the propeller being aligned with the direction of the wind and facing into the wind has the switching element of switch 302 in a neutral position with neither pole contacted. In alternate positions, against either stop, a circuit is made to the tower rotation valve 182. The solenoids of tower rotation valve 182 are in circuit with a control voltage, say 24 volts. Suppose that the switching element is against the left-hand pole of switch 302. In this case one of the solenoids of valve 182 will be actuated to position the valve in one of its positions, and motor 184 drives the tower in one direction. When the wind direction moves the switching element against the alternate pole, the alternate solenoid of valve 182 will be actuated, and motor 184 will drive the tower in the opposite direction. The response of weather vane 300 may be damped to avoid immaterial wind shifts and excessive operation of valve 182.

The bank of charging pumps of circuit 10 are driven by motors 70, 72 and 74, as already indicated. A lead 304 from a source of power provides current to motor 70. When current flows in lead 304, motor 70 operates to drive pump 38. Parallel time delay relays 306 and 307 off a line 308 are in series with supply line 304. Time delay relay 306 is in series circuit with motor 72, and time delay relay 307 is in series circuit with motor 74. The relays delay the opening of the circuit to pump drive motors 72 and 74. A pressure switch 310 in series with time delay relay 306 and charging pump drive motor 72 closes a circuit to that motor upon the sensing of an adequate threshold pressure in the hydraulic system, of, say, 2000 psi. A second pressure sensing switch 312 in series with time delay relay 307 and motor 74 senses the presence of a predetermined higher pressure than sensed by switch 310, say, 3000 psi, and completes a circuit to motor 74 when that higher pressure occurs. Time delay relays 306 and 307 keep motors 72 and 74 operating despite a temporary drop in pressure. A time delay relay 314 in parallel with time delay relays 306 and 307 and switches 310 and 312 permits the bypassing of those switches for a period of time. Timer relay 314 is in circuit through a charge pressure emergency pressure sensitive switch 316. In the event that the hydraulic systems cannot maintain a minimum pressure of, say, 300 psi, switch 316 will close, starting timer relay 314 and energizing motors 72 and 74 to increase the pressure of the charging circuit. If at the end of the time set on timer relay 314 low pressure conditions persist, a new cycle commences.

Pressure switch 174 is in a circuit between a power source and high pressure charging pump drive motor 138. Pressure switch 174 is normally closed. When the high pressure occurs, the circuit to motor 138 is interrupted. Pump drive motors 315 and 317 for pumps 220 and 222 are in circuit with the power source through lead 318.

The circuits to the motors of the high pressure charging pump, charging circuit pump drive motors, and the motors for the lubrication system are all controlled by a wind speed sensing anemometer and switch 320 and a time delay relay 321. Relay 321 energizes upon the occurrence of sufficient wind. When the relay times out, a circuit to the pump drive motors may be established. In other words, when there is sufficient wind for a sufficient period of time, the circuit to the pump drive motors is established.

Propeller control feathering circuit 26 is in series circuit with a propeller safety and unfeathering circuit 322, and both are in series circuit with a source of control voltage. Assuming a circuit is made through circuit 322, the solenoid of fluid inlet valve 132 is actuated to open that valve. The solenoid of valves 144, 150, and 154 are also energized to close these valves. Pressurized fluid to cylinder 128 can then exist. The solenoid of valve 154 is in series circuit with a normally closed generator overspeed switch 324. When generator overspeed switch 324 opens in response to excessive generator speed, solenoid 154 drops out of circuit and valve 154 opens to unfeather the blades of propeller 16. A pair of normally closed propeller centrifugal switches 326 and 328 are in series circuit with the solenoids of valves 144 and 155, respectively. When the propeller blades overspeed, the centrifugal switches open, deenergizing the solenoids of valves 144 and 150 to open these valves and unfeather the propeller blades. As will be recalled, there are two centrifugal switches for the propeller blades, one in each of two of the blades, to be sure of unfeathering when there is propeller overspeed.

The circuits to the solenoid of valves 132, 154, 150, and 144 are also in series with normally closed high pressure switch 114. When switch 114 opens in response to high pressure across restrictor 112 (see FIG. 1), valve 132 closes and valves 154, 150, and 144 open to promptly unfeather propellers 16. Pressure control switch 120 bypasses a bank of low pressure threshold limiting switches 330 in circuit 322 that open in response to less than optimum conditions in the system when the pressure is maintained sufficiently low in the circuit to keep switch 120 closed. Emergency closedown switches 332 of circuit 322 are in series with both low pressure switch 120 and bank of switches 330.

As seen in FIG. 3A displacement motor control valve 93 for displacement motor 20 has a control circuit 334. The solenoid of valve 97 is in a series circuit between the source of control voltage and a propeller speed sensor switch 335. When there is sufficient propeller speed, speed sensor 335 closes, establishing a circuit to the solenoid of valve 97. Valve 97, it will be recalled, controls the bypass circuit across motor 18. When the solenoid of valve 97 energizes, the bypass circuit closes, and motor 18 can come on line. Cylinder 100 receives pressurized fluid through valve 97 and slowly closes bypass valve 95, so that pressure can exist across motor 18. A propeller speed sensor switch 336 is in series circuit between the source of control voltage and the solenoids of displacement motor control valve 93 through a hydraulic pressure sensor switch 337. When there is adequate propeller speed, switch 336 closes to establish a circuit to hydraulic pressure sensor switch 337. This latter switch is a two-position switch, the poles of which control the upper and lower solenoids of displacement motor control valve 93. When the hydraulic pressure is too high, displacement control valve 93 operates to increase the displacement of motor 18 to permit a greater flow rate through it. The converse happens when the hydraulic pressure sensor senses too low a pressure and the switching element of switch 337 switches over to the alternate pole.

Propeller speed and load are correlated through a bridge circuit 338 (FIG. 3A). Bridge circuit includes a relay 339 having an armature 340 that responds to the electromagnetic force induced through opposed coils 341 and 342 of the relay. With current flowing in one direction through the coils, the armature will be attracted to a first fixed contact 343. With current flowing in the opposite direction, the armature will be attracted to a second fixed contact 344. A potentiometer 345 coupled to a pressure transducer develops a voltage signal proportional to pressure in hydraulic circuit 24 just downstream of pump 14, say, in line 86. This signal will appear at junction 346.

A second voltage signal is determined by a potentiometer 347. Potentiometer 347 couples to a propeller speed transducer so that the resistance of the potentiometer changes with propeller speed. The voltage signal developed across this potentiometer appears at a junction 348. Resistors and potentiometer 349 in parallel with potentiometer 345 permit trimming the bridge circuit for proper response of propeller speed with hydraulic fluid pressure. Four potentiometers 350 straddling junctions 346 and 348 also serve in the trimming function, and as load resistors.

Contact 343 controls an electrical circuit between control voltage and ground through one of the solenoids of valve 93, which controls fluid flow and the direction of fluid flow to displacement control motor 20. Contact 344 is in circuit with the voltage source and controls the flow of current to the opposite solenoid of valve 93 and, therefore, produces a flow of fluid through valve 93 in the opposite direction from that produced by the circuit established through fixed contact 343.

In a practical embodiment of the present invention, the following values obtain in the bridge circuit. Potentiometer and pressure transducer 345 has a variable resistance of from about 40 ohms at 4000 psi to about 10 ohms at 1000 psi. Potentiometer and speed transducer 347 varies in resistance from 40 ohms at 40 miles rpm to about 10 ohms at 10 rpm. Assume an equilibrium condition with the wind at 25 miles per hour, the pressure downstream of pump 14 at 2500 psi, and an rpm of the propeller at 25. Because of equilibrium, the solenoids of valve 93 are not energized, and motor 20 is out of circuit. The armature of relay 339 is in its neutral position between fixed contacts 343 and 344. Potentiometer 345 is at 25 ohms and potentiometer 347 is also at 25 ohms. The voltages at junction 346 and at junction 348 is each 15 volts. Assuming that the wind picks up to 30 miles per hour, the pressure will rise in the system to, say, 3500 psi. The propeller speed remains constant even with this increase in pressure. The optimum propeller speed with a wind speed of 30 miles per hour may be 30 rpm. The pressure is appropriate for a wind speed of 35 miles per hour, 5 miles per hour above existing wind speed. The resistance in potentiometer 345 will rise to 30 ohms. The voltage at junction 346 will lower to 12 volts. The voltage at junction 348 will remain at 15 volts because the propeller speed has not changed yet. The armature of relay 339 will be pulled into contact with fixed contact 343, thereby energizing one of the coils of valve 93. The control motor 20 will then be in hydraulic circuit, and the swash plate of generator driving motor 18 will be moved to increase the displacement of that motor and permit more fluid to flow through the circuit. Propeller speed can then increase, and will increase. As the propeller speed picks up to 26 rpm, potentiometer 347 changes in value to 16 ohms. The voltage at junction 348 of relay 339 will then reduce to 13 volts. The fluid pressure will then decrease as a result of the increase in the speed of the propeller to 3400 psi. With a reduction in fluid pressure, potentiometer 345 will decrease in resistance, but not enough to balance the bridge circuit. The process proceeds on a continuous basis, with the solenoid of valve 93 remaining energized and displacement motor 20 continuing to increase the displacement of motor 18. Propeller speed will continue to increase, and the fluid pressure will continue to drop, both of these variables approaching a new equilibrium state. Equilibrium will be achieved at a wind speed of 30 miles per hour, a propeller speed of 30 rpm, a hydraulic pressure of 3000 psi, a resistance across potentiometer 345 of 30 ohms, and a resistance across potentiometer 347 of 30 ohms. The voltage at junction 346 and at junction 348 will be equal at 14 volts, and the armature of the relay will be in a neutral position. The solenoid of valve 93 then is unenergized and goes back to neutral. The generator drive motor 20 will then have a constant displacement corresponding to a wind speed of 30 miles per hour and a propeller speed of 30 rpm.

With a decrease of wind speed, the process reverses. The resistance of potentiometer 345 drops. The voltage to junction 346 of relay 339 increases. The armature of the relay moves over to contact fixed contact 344, and the hydraulic control valve 93 then actuates to reverse the direction of displacement control motor 20. This requires a corresponding drop in the speed of the propeller, with a corresponding increase in fluid pressure in the hydraulic circuit. The voltage at junction 348 of relay 339 will then increase, but not enough to balance the bridge circuit. Eventually the voltages at the junctions will be the same, and hydraulic valve 93 will close the hydraulic circuit to motor 20.

Variable potentiometers 350 not only serve to calibrate the system, but can also be used to vary the response of the speed-pressure relationship, if such variation is thought necessary for any reason.

The circuit of generator 22 includes a normally open generator speed switch 351 (FIG. 3B) that closes upon the generator reaching a predetermined speed of, say, 1150 rpm. With the closing of switch 351, a circuit is established between the control voltage source and a line contactor relay 352. Relay 352 closes a circuit between generator 22 and the utility grid. Relay 352 also energizes a time delay relay 354 that controls contacts 356 in the field windings of generator 22. When relay 354 times out, in a few seconds, contacts 356 close to establish the circuit in the field windings of the generator.

Figure 4B:
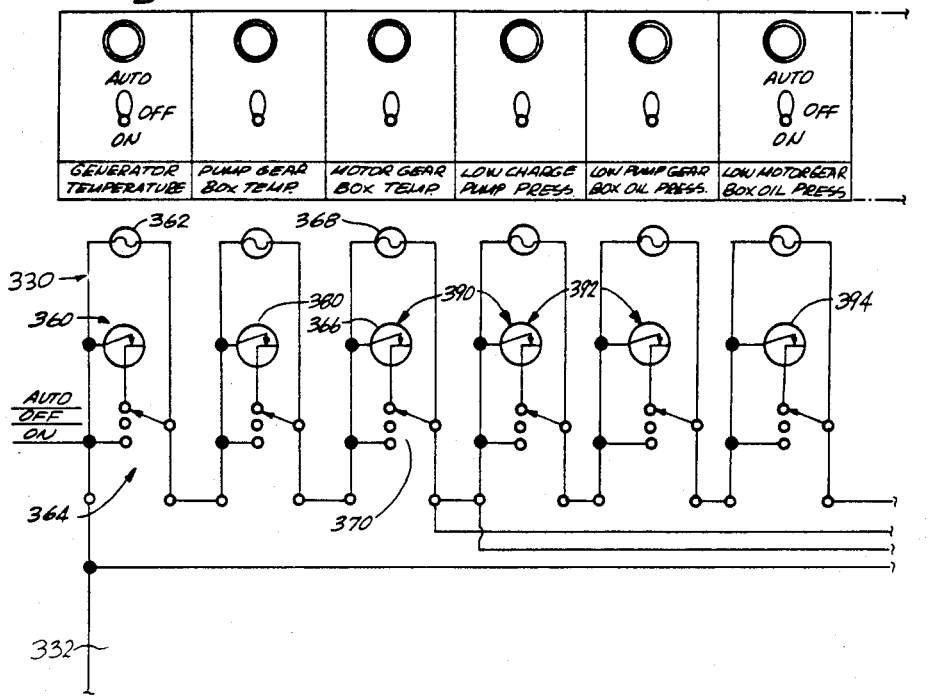
FIGS. 4A through 4F schematically illustrate in greater detail a portion of the electrical control circuit of FIGS. 3 through 3F
Figure 4A:
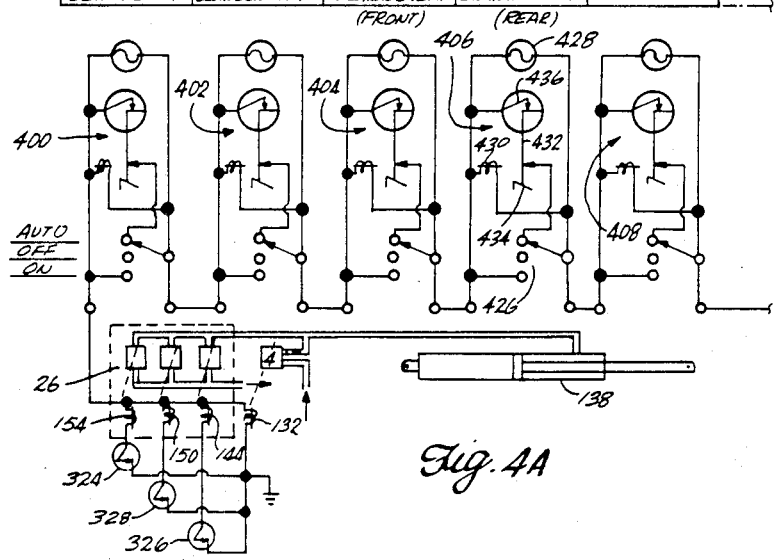
Figure 4C:
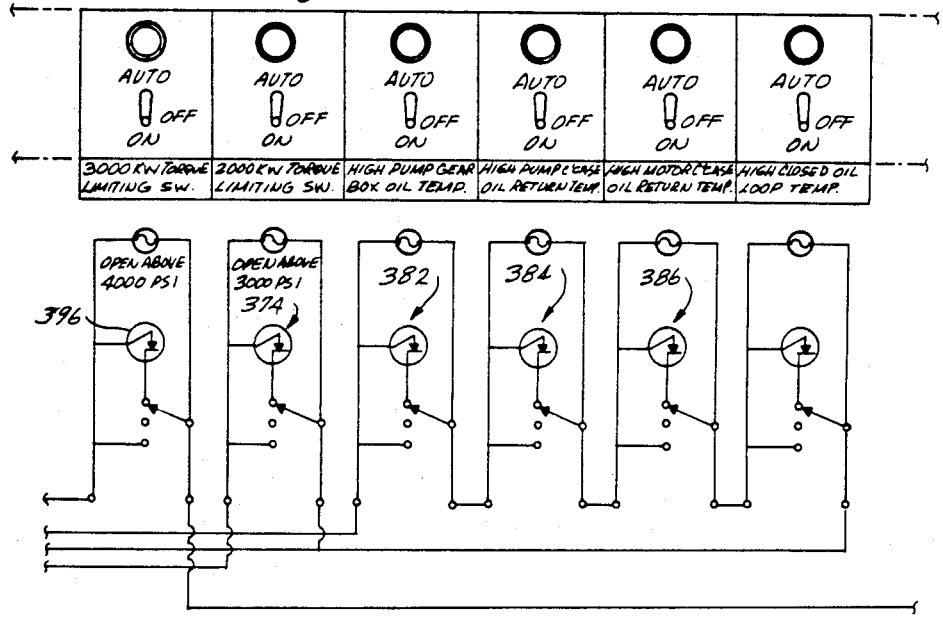
Figure 4D:
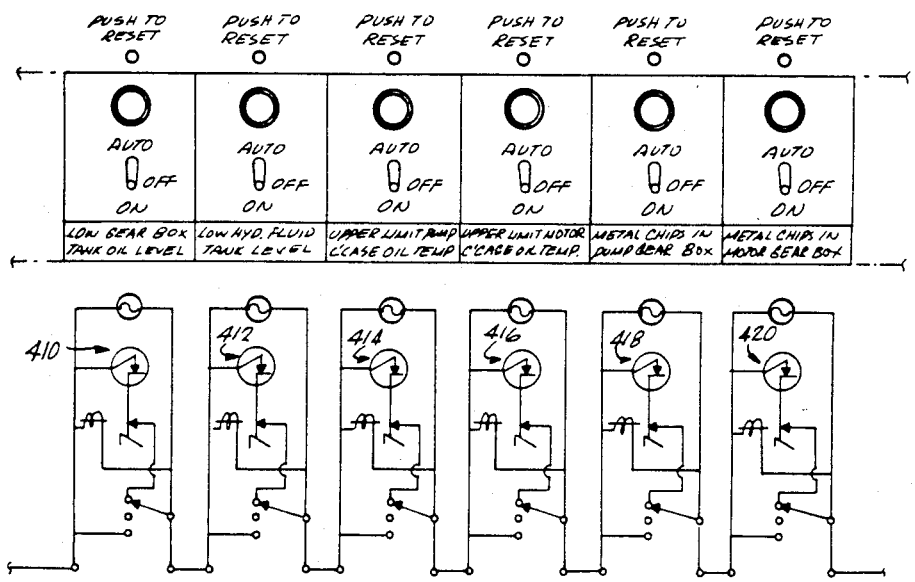
Figure 4E:
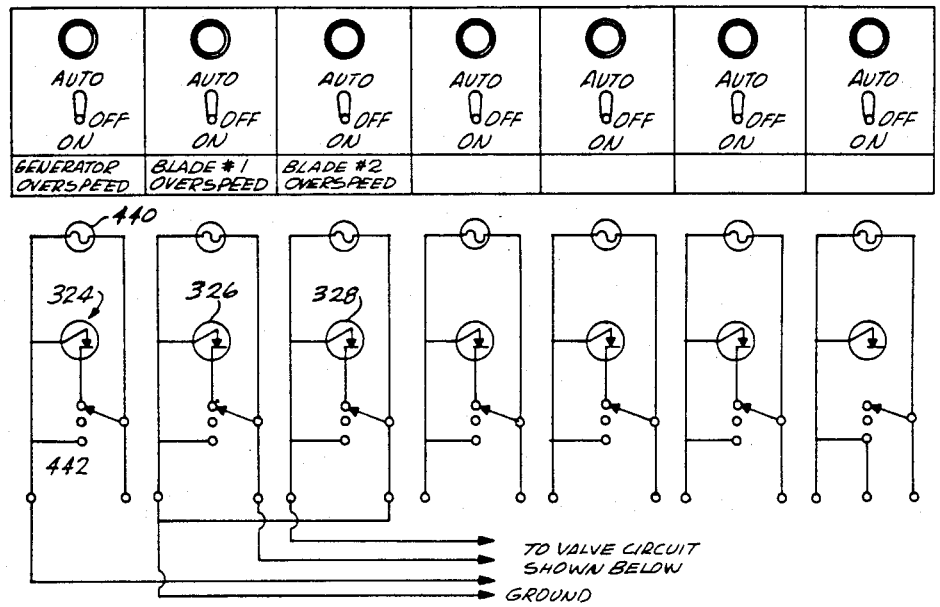
Figure 4F:
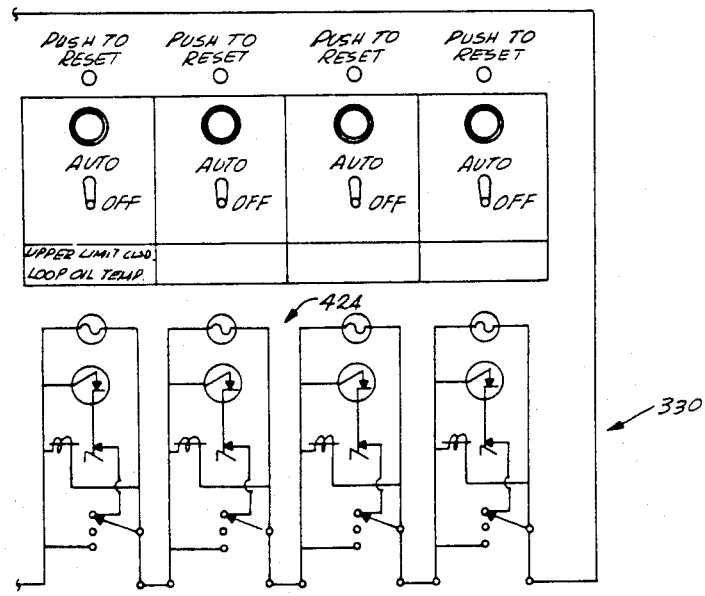

FIGS. 4A, 4B, and 4C illustrate the overload circuitry attendant with the controls of the present invention. The Figures are very descriptive. The operation of many of the controls is identical with the operation of other of the controls. Accordingly, this verbal description will be comparatively short.

As stated already, the control circuit for the present invention envisions a limited shutdown to low pressure operation in response to certain stimuli. In addition, the control circuit of the present invention envisions complete shutdown in response to more drastic stimuli. Furthermore, the circuit limits operation to a maximum predetermined pressure.

As has already been explained, overload conditions are corrected by feathering the propellers. The propellers are allowed to free wheel when the rest of the system shuts down. Free wheeling is the natural state of the system.

In this brief introduction to FIGS. 4A, 4B, and 4C control circuit 322 consists of a bank of serially wired switches connected to a source of control voltage, say 24 volts. The switches are mounted in a panel of a control console. The function of each switch is shown in the legend of the drawings. The first switch shown there is a generator temperature switch and is indicated by reference numeral 360. A light 362 in parallel circuit with switch 360 between the voltage source and ground only draws current when the circuit through switch 360 is open. A manual bypass and automatic set switch 364 is in circuit with switch 360 to selectively place the switch into circuit, to interrupt the entire circuit, or to bypass switch 360. When switch 364 is switched to "ON", switch 360 and light 362 are bypassed. Those switches and circuit elements between switch 364 and ground may still be in circuit, depending on the state of these switches. When the switching element of switch 364 is on "OFF", the entire circuit from switch 364 to ground is open. When switch 364 is on "AUTOMATIC," then switch 360 is in circuit. The switch is controlled by generator temperature and thus is a thermostatic switch. If the temperature becomes excessive, switch 360 opens, opening the circuit between it and ground. This prevents the making of the circuit to the solenoids of valves 132, 154, 150, and 144. Accordingly, valve 132 will close and valves 154, 150 and 144 will open and the propeller blades will feather to lower the pressure of the circuit to a lower maximum operating pressure. When switch 360 opens, light 362 is no longer shunted, and it will go on to indicate to an operator the source of potential trouble.

Within circuit 330 a motor gear box temperature switch 366 is in circuit between switch 360 and ground. It is controlled in the same manner as switch 360 and includes as associated elements an indicator light 368, wired in parallel with switch 366, and a manual, three-position switch 370. When switch 370 is switched to "ON," switch 366 and light 368 are bypassed. The light will go out, if it was previously on. When switch 370 is at its "OFF" position, the entire circuit between switch 370 and ground is broken. When switch 370 is in its "AUTOMATIC" position, switch 366 is in circuit. A temperature sensor senses motor gear box temperature of motor 18. If this temperature should become elevated beyond a desired point, switch 366 opens. The shunt around light 368 is then removed and light 368 sees full line current and will be energized.

A switch 374 is wired in parallel to many of the safety switches shown, and includes as associated circuit elements a light 376 and a three position switch 378. Switch 374 senses torque in the torque tube from the propellers by sensing pressure in the hydraulic system. Switch 374 opens at a pressure above the lower limit operating pressure previously referred to, say, 3000 psi. With the opening of switch 374, circuit elements below the switch and ground are also taken out of circuit. However, all of the circuit elements in parallel with switch 374, if closed, can bypass the switch. In the drawing, these parallel circuit elements are: generator temperature switch 360, a pump gear box temperature switch 380, a motor gear box temperature switch 366, a high pump gear box oil temperature switch 382, a high pump crank case oil return temperature switch 384, a high motor crank case oil return temperature switch 386, and a high closed oil loop temperature switch 388. Those circuit elements in series with switch 374 include: low charge pump pressure switch 390, a low pump gear box oil pressure switch 392, a low motor gear box oil pressure switch 394, and a maximum pressure sensing switch 396.

Clandestine shutdown circuit 332 is in series with the circuit elements of low upper pressure control circuit 330. A host of potentially disastrous conditions can be sensed with circuit elements 332. Each of the sensing elements controls a latching relay. Each latching relay of circuit 332 serially connects to the other latching relays of the circuit.

The illustrated latching relays having specified functions include: an upper limit generator temperature latching relay 400, an upper limit pump gear box temperature latching relay 402, a high propeller shaft bearing temperature (front) latching relay 404, a high propeller shaft bearing temperature (rear) latching relay 406, an unbalance (propeller) latching relay 408, a low gear box tank oil level latching relay 410, a low hydraulic fluid tank level latching relay 412, an upper limit pump crank case oil temperature latching relay 414, an upper limit motor crank case oil temperature latching relay 416, a metal chips in pump gear box latching relay 418, a metal chips in motor gear box latching relay 420, and an upper limit closed loop oil temperature latching relay 422. In addition, the circuit is amenable to other latching relays for detecting other emergency conditions. These additional latching relays are indicated by reference numeral 424. Only the unbalance latching relay requires comment. If the propeller gets out of balance, this relay opens and the circuit opens. This condition could arise with the loss of one of the propeller blades.

High propeller shaft bearing temperature latching relay 406 operates in the manner typical of the rest of the latching relays. A three-position manual switch 426 and a light 428 are associated circuit elements for latching relay 406. When switch 426 is in "AUTOMATIC", latching relay 406 is in circuit. When switching element of switch 426 is on "OFF", an open circuit exists at latching relay 406 and no current can flow through circuit 332. Accordingly, the entire system shuts down because the propellers go to full feather. When the switching element of switch 426 is in the "ON" position, high propeller shaft bearing temperature relay 406 is shunted.

Relay 406 includes a coil 430 that normally attracts an armature 432 to the left in the drawing. A latch 434 can lock the armature open. A switching element 436 holds armature 432 in place to complete the circuit through the relay. Upon the sensing of a high propeller shaft bearing temperature, switching element 436 opens, allowing armature 432 to move towards coil 430 in response to the attraction of the coil, and to ride over the step of latch 434 into a locked position. A reset button 438 must be manually pushed to release armature 432 from latch 434 and permit the closing of a circuit through switching element 436.

FIGS. 4A, and 4C also show more explicitly the details of generator overspeed switch 324 and blade overspeed switches 326 and 328. As described with reference to FIGS. 3A, and 3B, these switches control feathering of the propellers by dropping the pressure of cylinder 128 by dumping fluid from the cylinder into main hydraulic tank 30. In the case of generator overspeed switch 324, it is in series with the solenoid of valve 154 and opens the circuit to that valve. With the opening of that circuit, cylinder 128 is in circuit with main hydraulic tank 30. Similarly, with switches 326 and 328, the solenoids of valves 150 and 144 dump fluid from cylinder 128 to feather the propellers. The arrangement for switch 324 is typical. Switch 324 has an associated light element 440 and a three-position manual switch 442. The positions of manual switch 442 include "AUTOMATIC", "ON" and "OFF". When switch 442 is in the "ON," position, switch 324 is bypassed. When switch 442 is on the "OFF" position, switch 324 is out of circuit. With switch 324 out of circuit, valve 154 is open, and the propellers feather. When switch 442 is in the "AUTOMATIC" position, switch 324 is in circuit in the manner described.

With this understanding of the control circuitry, the attendant structural components of the wind power generating system of the present invention will be described.

With reference to FIG. 5, tower 250, constituted primarily of various load-taking beams sets on a base 462. A track 464 on the base determines the path of the tower 250 as it rotates as a unit about a pivot 465. Propeller blades 16 mount on tower 250 adjacent platform 252. Propeller blades 16 are three in number. A skin 466 encompasses portions of the generator system, propeller feather control components, and associated framework, all mounted on platform 252. As previously stated, these portions include: torque tube 256, hydraulic cylinder 128, gear box 254, motors 14, and attendant line and control circuitry. A catwalk guard rail system 467 on platform 252 provides safety.

Tower 250 is made up of a family of structural beams. These beams are tubular to reduce wind resistance. Fore legs 470 of this family meet at an apex 472 aft of the plane of rotation of propeller blades 16, and proceed down to a base constituted of a main horizontal box frame truss 474 at the bottom of the tower. Aft legs 476 extend upwardly and at an acute angle from legs 470 to an apex 478 aft of apex 472 and at the rear of platform 252. Platform 252 secures to these legs at the apexes. A diagonal bracing strut 480 extends from apex 472 to a rear corner of box frame truss 474. At regular horizontal intervals, generally horizontal, triangular stiffening trusses add rigidity to the beam system by tying strut 280 into fore legs 470. Three such levels of trusses are shown at reference characters 484, 485, and 486. Secondary diagonal stiffening struts 488 extend between box frame 474 and truss 486 and tie in at their corners to fore legs 470 and strut 480. Similarly, such stiffening struts extend between the other two trusses, as indicated by reference numerals 487 and 488. In the plane of fore legs 470, additional diagonal stiffening struts 493 extend between the box frame and trusses.

Central pivot 465 rigidly interconnects with the rest of the tower through beams 492. These beams extend from a central post 494 of the pivot to corners of box frame truss 474. The pivot includes central upstanding axle receiving post 494, and an axle anchored to ground and received in the post. A generator machine room 496 may be disposed on base truss 474.

Propellers 16 include a variable pitch propeller hub cowling 500 capped by a streamline nose 502. A root fairing 504 for each propeller blade couples into the hub. The propeller blades are preferably of laminated wood and fiberglass construction. As previously mentioned, the legs, beams, struts, and trusses of tower 250 preferably are of tubular steel.

Figure 6:
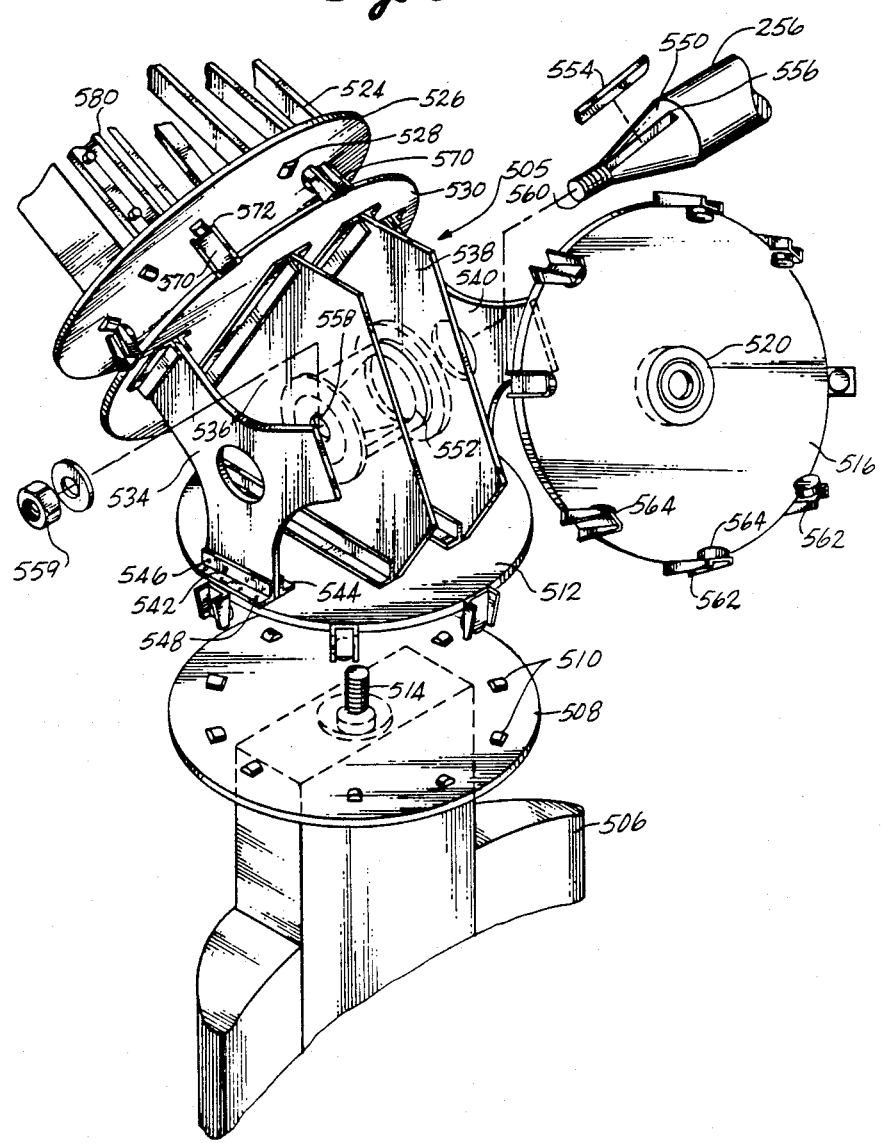
FIG. 6 shows in an exploded view a hub and propeller blade relationship of the present invention.

FIG. 6 shows in exploded view the components of a hub 505 beneath hub cowling 500. FIG. 6 and FIG. 7 show the relationship of the hub to the blades. Basically, the propeller system includes three propeller blades that extend radially from an axis of rotation at angular intervals of 120 degrees with respect to each other. The propeller blades include at their base circular thrust plates. Each plate mounts a plurality of bearings. Thus, for propeller blade 506, a circular thrust plate 508 mounts a plurality of bearings 510. These bearings track on a complementary thrust base plate 512 of the hub. A central axle 514 of blade 506 journals in a bearing in base plate 512 and may locate the feathering axis of rotation of the blade with respect to the base, as by a nut and bolt connection. This type of arran9ement is also seen for a circular thrust base plate 516 for a blade 518 (see FIG. 5). Thrust base plate 516 has a bearing 520 that receives the complementary axle of blade 518. The axle coupling will be more apparent from the following description. A blade 524 completes the trilogy of blades. That blade has a circular thrust plate 526 and mounts a plurality of circularly arrayed bearings 528 that bear on a circular thrust plate 530 of hub 505. Plates 512, 530, and 516 mount together through parallel plates 534, 536, 538, and 540. These plates attach to the thrust base plates as through angles and fasteners, typified by angles 542 and 544 for plate 534. Angles 542 and 544 attach to a leg of a plate 534, as through fasteners 546, and to thrust base plate 512, as through fasteners 548.

Torque tube 256 has a conical nose 550 received in a complementary conical seat 552 mounted between plates 536 and 538. Seat 552 has flanges at either end whereby the seat attaches to its mounting plates. A key 554 resides in a slot 556 in nose 550 and a slot 558 in seat 552 to secure torque tube 256 to the seat against rotation of one with respect to the other. Tube 256 longitudinally anchors in the seat through a female threaded fastener 559 that attaches to a male threaded tip 560 of the torque tube.

Each of the circular thrust base plates 512, 516, and 530 mount rollers that bear on the opposite side of their complementary circular thrust plates. Thus, for plate 516, a plurality of equally spaced roller mounting brackets 562 extends from the perimeter of plate 516 past the perimeter of the thrust plate of blade 518 (not shown in FIG. 6) that cooperates with plate 516. A plurality of rollers 564 are mounted on brackets 562 and tracks on the side of the circular thrust plate opposite that which faces thrust base plate 516. A circumscribing band 565 attaches by welds to brackets 562 and keeps the brackets from camming under radial loads. The mounting arrangement is identical for the other blades. Thus, thrust base plate 530 mounts a plurality of roller mounting brackets 570, each of which in turn mounts a roller 572. Each roller 572 tracks on the side of plate 526 opposite that which faces plate 530.

Rollers 564 and the bearings on the complementary thrust plates transfer blade loads to the hub. The rollers transfer tension loads, and the bearings transfer compression loads.

Each of the blades attaches to its circular plate as by a plurality of trusses 580 that attach to the blade root and to plate 526, as by threaded fasteners. This arrangement will be described subsequently with reference to FIGS. 8 and 9.

With reference especially to FIGS. 7, 8, and 9, the feathering linkage is shown. In the side elevational view of FIG. 9, nose 502 contains an apical, triangular-in-profile frame 600. This frame extends from a mount on hub 505. Frame 600 is a rigid structure that serves to properly orient control cables 260 that are used for unfeathering.

One of these control cables is shown in FIG. 9 at 602. A tension cable system 604 is also shown. These are for blade 518. Identical control cables and tensioning cables are used for each of the blades. As previously described, cylinder 128 unfeathers the blades. The tensioning cables aid the wind in positively feathering the blades by applying a positive force in a direction tending to feather the blades.

Feathering cylinder 128 rigidly attaches to frame 600 at a cross plate 606, as through a clevis and pin 608. Cylinder 128 extends through a hole in a reinforcing plate 610 of frame 600. Cable 602 reeves over a pulley 614 attached to a head piece 612 of frame 600. Cable system 604 reeves over a pulley 616 attached to head piece 612. Pulley 602 attaches to the power shaft of cylinder 128 at block 260. Thus, when cylinder 128 senses pressure, a piston in the cylinder pulls on cable 602 in a direction to unfeather blade 518. Cable 602 attaches to blade 518, as through a pad eye 620, and reeves over direction orienting pulleys 622 and 624 mounted on frame 600.

Tensioning cable system 604 includes first and second tension multipliers 630 and 632. Pulleys of tension multipliers 632 attach to thrust plate 520, which is superimposed by a circular thrust plate 634 for blade 518 in FIG. 9. More specifically, tension multipliers 632 includes a block 634 that attaches by a pivot to plate 516.

An anterior block 638 of tension multipliers 632 attaches to a cable section 640 that reeves over pulley 616. An anterior block 642 attaches at the other end of cable 640. Tension muliplier 630, that includes anterior block 642, also includes a posterior block 644. A cable section 646 anchors at one of its ends to block 644, and at the other of its ends on a pad eye 648. Pad eye 648 attaches to blade 518 close to circular thrust plate 634. Directing pulleys 650 and 652 orient cable 646 and tension multipliers 630.

Tension multipliers 630 and 632 are formed from a plurality of shock cord turns, or other elastic elements, such as coil springs, attached in parallel between their associated blocks. The deflection of each cord in the multiplier is effectively multiplied by the number of cords between the blocks. With the shock cords, a continuous length of such cords is reeved over pulleys of the blocks. The tension multiple is determined by the number of passes from block-to-block that the cord makes.

The tension multipliers oppose the force applied to the blades by unfeathering cylinder 128. The multipliers also augment the wind in biasing the blade towards full feather. An identical arrangement obtains for each of the other two blades.

Tower 600, more specifically, includes reinforcing plates 606 and 610 at intervals along its length. As previously mentioned, plate 606 also anchors cylinder 128. Frame 600 ends in head piece 612. Frame 600 includes three struts as its main frame members, indicated by reference numerals 660, 662, and 664. These members are laid out in end section views at the apexes of equilateral triangles. If required, cross bracing can be provided. Thus, frame 600 can be considered a tripod.

The mounting of the blades to their circular base thrust plates is seen in all three FIGS. 7, 8, and 9.

As can be seen there, a parallel set of plates 670 and 672 abut a root 674 of blade 518 to clamp the root between them. These plates secure to thrust plate 634 through angle systems 676 and 678. Angle system 676 includes two opposed angles. A flange of each of the angles attaches to thrust plate 634 as by threaded fasteners. The complementary flange of each of the angles attaches to plate 672. The same obtains for angle system 678. One flange of each of the angles of that system attaches directly to plate 634, as by threaded fasteners. Facing flanges of the system attach to and sandwich plate 670 between them, the attachment again is by threaded fasteners. Longitudinally extending angle systems extend away from plate 634 along the length of blade 518 to provide anchors for diagonal struts. Also, these angles provide the bearing for fasteners that attach the angles to plates 670 and 674 and the plates to blade 518. One such fastener is shown by reference numeral 680. The fasteners extend completely through the blade to the complementary angle system on the other side.

Taking one of the angle systems for the struts for specific description, a pair of opposed and spaced-apart angles 682 and 684 attach through plate 670 to the root of blade 518. A space between facing flanges of the angles defines a clevis for a box beam strut 686. This strut attaches to the clevis defined by angles 682 and 684, as by threaded fasteners. The strut attaches to thrust plate 634, as by a clevis 688 and an appropriate fastener.

With reference to FIG. 10, the axle arrangement for axle 514 is shown in greater detail. Blade 506 is attached to circular thrust plate 508 by the angle system described in detail previously for another blade, but repeated here briefly for completeness. Plates 700 and 702 sandwich a root 704 of blade 506 between them, and attach to plate 508 through opposed angle systems 706 and 708. Each angle system is made up of opposed angle pairs, facing flanges of which sandwich plates 700 and 702 between them. Thus for system 708, a pair of angles 710 and 714 sandwich plate 700 between them and attach to the plate as by threaded fasteners 716. The other flanges of angles 710 and 714 attach to plate 508, as through the threaded fasteners 718 and 720. Plate 512 attaches to plates 536 and 538 through a similar type of angle system. A pair of opposed angles 730 and 732 attach to plate 512, as by threaded fasteners 734 and 736. Angles 730 and 732 attach to plate 536, as through threaded fasteners 738. Opposed flanges of angles 730 and 732 abut plate 536.

Axle 514 is constituted of a bolt having a head 740 that bears on a bridging plate 742, which in turn bears on flanges of angle systems 706 and 708. The bridging plate attaches to plate 508 by fasteners 720. A spacer 744 fills the space between bridging plate 742 and plate 508. A bushing 750 in a hole through plate 512 receives the shank of axle 514. A thrust bearing 752 mounted through a bearing block 754 to plate 512 receives axle 514. Play in the system is eliminated by nut 760 that is brought to bear against an inner race of bearing 752. A spacer 62 positions the outer race of bearing 752 properly with respect to the bearing mounting block.

FIG. 11 illustrates some of the details of torque tube 256. The tube extends aft of seat 552 through bearings 266 to a coupling 770. That coupling couples the torque tube to a shaft 772 extending from gear box 254 for pump complex 14. The gear box and pump complex mount on a vertical wall 774 that extends above platform 252, as through a plate 776 and cooperating fasteners.

The relationship between propeller power output and propeller speed is shown in FIG. 12. That Figure plots percent-of-power output as the ordinate versus tip speed ratio as the abscissa. Percent of power output refers to the percent of maximum possible power. 100 percent occurs at a tip speed ratio of six. The tip speed ratio refers to the ratio of propeller tip speed to wind speed. The particular plot is for a blade having a pitch of seven degrees.

This particular design requires for most efficient performance a tip speed ratio of six. For example, with a wind of 20 miles per hour the tip speed of the propeller blades must be 120 miles per hour for maximum power generation. Let it be supposed that the wind speed changes and goes down to 15 miles per hour. This would produce a tip speed ratio of eight, 120 miles per hour divided by 15. The percentage of maximum power developed under this hypothetical situation would be about 60 percent. The control of the present invention quickly recognizes the disparity between actual performance and optimum performance. The ideal tip speed for a 15 mile per hour wind is 90 miles per hour. Accordingly, the present invention decreases the displacement of the generator drive motor so that less fluid per unit time can go through the propeller-driven pump. This will produce a drop in propeller speed.

Let us suppose that instead of a drop in wind speed from 20 to 15 miles per hour there is an increase in wind speed to 25 miles per hour. This drops the effective output to between 85 and 90 percent of optimum. To correct the deficiency, the propeller speed must increase. As will be recalled, the present invention responds to this requirement by increasing the displacement of the motor that drives the generator to permit more hydraulic fluid to course through the propeller-driven pump in a unit of time.

The signals that produce that adjustment in motor displacement result from a comparison of propeller speeds and system pressure, all of which has been described in detail previously.

FIG. 13 illustrates the power produced by a wind power generator employing a variable speed propeller set at optimum pitch. Power is shown as the ordinate and wind speed as the abscissa. Power increases as the cube of the wind speed. A wind generator device employing a constant speed propeller shows a rate of change of power with wind speed that drops off with increasing wind speed. Wind generators of this type usually stop operation entirely at some predetermined wind speed. This is shown for the hypothetical generator by the cessation of power production at 40 miles per hour.

The present invention has been described with reference to a preferred embodiment. The spirit and scope of the appended claims, however, should not, necessarily, be limited to the foregoing description.

What is claimed is:

1. A wind power generator of the type that varies propeller speed with wind speed comprising:
   (a) a tower having a base and a propeller mount above the base;
   (b) a propeller mounted on the propeller mount of the tower for being driven in rotation by the wind;
   (c) a positive displacement hydraulic pump;
   (d) a positive displacement hydraulic motor;
   (e) load means driven by the motor and operable to maintain the speed of the motor constant;
   (f) hydraulic circuit means coupling the pump and the motor to drive the motor by the output of the pump;
   (g) means coupling the propeller to the pump to drive the pump; and
   (h) means to vary the displacement of the positive displacement motor and the pressure in the hydraulic circuit in response to a change in pressure in the hydraulic circuit produced by the propeller while the propeller rotates at constant speed, the displacement of the motor and the pressure in the hydraulic circuit being changed in accordance with a predetermined schedule that corresponds the pressure in the hydraulic circuit with wind speed so that the displacement of the motor, the pressure in the hydraulic circuit, and propeller speed increase with increasing wind speed and decrease with decreasing wind speed and the power produced by the wind power generator varies accordingly, the hydraulic circuit and the constant speed of the motor preventing a change in propeller speed until the displacement of the motor changes.

2. The wind power generator claimed in claim 1 wherein:
   the load means includes generator means operable to maintain the speed of the motor constant.

3. The wind power generator claimed in claim 2 wherein the generator means includes synchronous generator means.

4. The wind power generator claimed in claim 2 wherein the pump is mounted on the tower proximate the propeller, and the motor is mounted proximate the base of the tower.

5. The wind power generator claimed in claim 1 including means to rotate the tower to face the propeller into the wind.

6. The wind power generator claimed in claim 5 including means to limit the pressure in the hydraulic circuit means to a predetermined threshold level below the pressure that could otherwise be achieved, the pressure limiting means being operable upon the occurrence of predetermined malfunctions of the wind power generator.

7. The wind power generator claimed in claim 6 including means to limit the pressure in the hydraulic circuit to a predetermined maximum level, the predetermined maximum level being greater than the threshold level.

8. The wind power generator claimed in claim 5 including means to limit the pressure in the hydraulic circuit to a predetermined maximum level.

9. The wind power generator claimed in claim 8 wherein the load means includes electrical generator means.

10. The wind power generator claimed in claim 9 wherein the generator means includes synchronous generator means.

11. The wind power generator claimed in claim 10 wherein the pump is mounted on the tower proximate the propeller, and the motor is mounted proximate the base of the tower.

12. The wind power generator claimed in claim 11 including means to limit the pressure in the hydraulic circuit means to a predetermined threshold level below the pressure that could otherwise be achieved, the pressure limiting means being operable upon the occurrence of predetermined malfunctions of the wind power generator.

13. In a wind power generator of the type having a tower, a propeller mounted for rotation on the tower in response to the driving force of the wind, and an electrical generator coupled to the propeller for the generation of electrical power by the wind, an improvement in the power coupling means comprising:
   (a) positive displacement pump means coupled to the propeller and driven thereby;
   (b) variable displacement, positive displacement motor means;
   (c) hydraulic circuit means coupling the pump means to the motor means, the output of the pump means driving the motor means through the circuit means;
   (d) means to vary the displacement of the positive displacement motor;
   (e) means controlling the displacement varying means to increase and decrease the displacement of the motor means and the pressure in the hydraulic circuit means as a direct function of the power produced by the wind through the propeller, the displacement varying means control accomplishing this by responding to the pressure in the hydraulic circuit means and propeller speed;
   (f) means for coupling the motor means to the generator; and
   (g) means to maintain the speed of the motor means constant.

14. The wind power generator claimed in claim 13 including:
   (a) means for feathering the propeller, such means being operable to normally maintain the propeller fully feathered; and
   (b) means to unfeather the propeller in response to the absence of any of a predetermined plurality of signals, which signals correspond to the presence of predetermined malfunctions of the wind power generator.

15. The wind power generator claimed in claim 13 including:
   (a) means for fully feathering the propeller, such means being operable to normally maintain the propeller fully feathered;
   (b) means to unfeather the propeller in response to the presence of a predetermined minimum wind speed on the propeller; and
   (c) means to disable the unfeathering means to feather the propeller by the feathering means upon the presence of a predetermined maximum propeller speed produced by a predetermined maximum wind speed on the propeller.

16. The wind power generator claimed in claim 13 including:
    (a) means for fully feathering the propeller, such means being operable to normally maintain the propeller fully feathered;
    (b) means to unfeather the propeller in response to the absence of a signal corresponding to a predetermined maximum speed of the propeller, the signal being related to the power output of the propeller; and
    (c) means to disable the unfeathering means to feather the propeller upon the sensing of the signal corresponding to the predetermined maximum speed of the propeller,
    whereby, when wind conditions are such that the propeller operates at the predetermined maximum speed, the propeller constantly feathers and unfeathers in response to the presence or absence of the power related signal.

17. The wind power generator claimed in claim 16 wherein the signal is a function of pressure in the hydraulic circuit.

18. The wind power generator claimed in claim 16 including:
    (a) means to generate a signal to inactivate the unfeathering means in response to the presence of any of a predetermined plurality of signals indicative of a potential malfunction; and
    (b) means for bypassing the inactivating unfeathering means that respond to the signals indicating potential malfunctions below a predetermined threshold signal related to the power output of the propeller, which predetermined threshold signal corresponds to a power output below the power output corresponding to the predetermined maximum speed.

19. The wind power generator claimed in claim 18 wherein the threshold signal and the signal corresponding to the predetermined maximum speed both are a function of the pressure in the hydraulic circuit.

20. The wind power generator claimed in claim 18 including means to inactivate the unfeathering means in response to the presence of any one of a predetermined plurality of signals indicating a potential catastrophic failure of the wind power generator.

21. An improvement in a wind power generating system of a type employing a tower having a base and a propeller mounted on the tower for rotation in response to the wind, the improvement which comprises:
    (a) means to position the propeller to face the wind regardless of wind dirction;
    (b) positive displacement pump means directly coupled to the propeller for being driven thereby;
    (c) positive and variable displacement motor means at the base of the tower;
    (d) hydraulic circuit means coupling the motor means with the pump means for driving the former by the output of the latter;
    (e) synchronous electric generator means drive coupled to the positive displacement motor; and
    (f) means for varying the hydraulic fluid pressure in the hydraulic circuit means and the displacement of the positive displacement motor means, the hydraulic fluid pressure increasing with increased wind speed and decreasing with decreased wind speed, the displacement of the motor increasing with increased fluid pressure in the hydraulic circuit means and decreasing with a decrease in the fluid pressure in the hydraulic circuit means, the fluid pressure in the hydraulic circuit means varying in accordance with a predetermined relationship of propeller speed and power.

22. The improvement claimed in claim 21 including:
    (a) means normally fully feathering the propeller; and
    (b) means to unfeather the propeller in the absence of predetermined signals that indicate a malfunction of the wind power generating system.

23. The improvement claimed in claim 22 including means responsive to a predetermined maximum pressure in the hydraulic circuit means to disable the unfeathering means and to thereby feather the propeller with the feathering means, the predetermined maximum pressure corresponding to a predetermined maximum propeller speed,
    whereby, the propeller feathers and unfeathers cyclically at the predetermined maximum propeller speed.

24. The improvement claimed in claim 23 including means to bypass selected of the predetermined signals to permit the unfeathering means to unfeather the propeller, the bypass means being operable to permit operation below a predetermined threshold pressure in the hydraulic circuit, which predetermined threshold pressure is below the predetermined maximum pressure.

25. The improvement claimed in claim 24 including means to feather the propeller in response to excessive wind gusts.

26. The improvement claimed in claim 24 including means to feather the propeller upon the generator overspeeding.

27. The improvement claimed in claim 26 including means to feather the propeller in response to excessive wind gusts.

28. The improvement claimed in claim 27 including means to feather the propeller in direct response to excessive propeller speed.

29. The improvement claimed in claim 28 including means to relieve excessive pressure in the hydraulic circuit means by shunting the motor means.

30. The improvement claimed in claim 23 including motor bypass means of the hydraulic circuit means, the motor bypass means including valve means normally shunting the motor means, and means responsive to a predetermined minimum operational propeller speed to slowly close the valve means and establish a hydraulic circuit to the motor means.

31. The improvement claimed in claim 30 wherein the motor bypass means includes means to rapidly close its valve means below the predetermined minimum operational propeller speed.

32. The improvement claimed in claim 31 including means to bypass selected of the predetermined signals to permit the unfeathering means to unfeather the propeller, the bypass means being operable to permit operation below a predetermined threshold pressure in the hydraulic circuit, which predetermined threshold pressure is below the predetermined maximum pressure.

33. The improvement claimed in claim 32 including means to feather the propeller in response to excessive wind gusts.

34. The improvement claimed in claim 33 including means to feather the propeller upon the generator overspeeding.

35. The improvement claimed in claim 34 including motor bypass means of the hydraulic circuit means, the motor bypass means including valve means normally shunting the motor means, and means responsive to a predetermined minimum operational propeller speed to slowly close the valve means and establish a hydraulic circuit to the motor means.

36. In a wind power generator of the type employing a tower, a propeller mounted on the tower for being driven by the wind, the propeller having a plurality of featherable blades, means for facing the propeller into the wind, and synchronous electrical generator means coupled to the propeller to generate electrical power, an improvement which comprises:
 (a) a positive displacement pump coupled to the propeller for being driven thereby;
 (b) a positive displacement generator motor, the motor being drive-coupled to the generator;
 (c) hydraulic circuit means to drive the motor by the output of the pump;
 (d) means constantly biasing the propeller blades to a fully feathered position;
 (e) means for unfeathering the propeller blades upon the existence of a predetermined threshold signal that is a function of a minimum operational wind speed;
 (f) first means for disabling the unfeathering means upon the sensing of any one of a predetermined number of potentially disastrous conditions for the wind power generator;
 (g) second means for disabling the unfeathering means upon the exceeding of a predetermined maximum pressure in the hydraulic circuit means to lower such pressure and to thereby cause cyclic feathering and unfeathering of the propeller blades as the predetermined maximum pressure cyclically is exceeded; and
 (h) means limiting the maximum pressure in the hydraulic circuit means to some predetermined threshold value lower than the predetermined maximum pressure upon the sensing of any one of a predetermined number of secondary dangerous conditions for the wind power generator by interrupting operation of the unfeathering means.

37. The improvement claimed in claim 36 including means for varying propeller speed as a function of pressure in the hydraulic circuit means and wind speed in accordance with a predetermined relationship that varies propeller speed and pressure in the hydraulic circuit means in a manner that maximizes the power efficiency of the wind power generator.

38. The improvement claimed in claim 36 including means for varying propeller speed as a function of pressure in the hydraulic circuit means and wind speed in accordance with a predetermined relationship that maximizes the power efficiency of the wind power generator, such means including means for varying the pressure in the hydraulic circuit means and for varying the displacement of the positive displacement motor, and circuit means operable to generate a signal that commands the displacement varying means to increase the displacement of the motor to increase propeller speed and increase the pressure in the hydraulic circuit means with increased wind speed and to decrease the displacement of the motor to decrease propeller speed and decrease the pressure in the hydraulic circuit means with decreased wind speed.

39. The improvement claimed in claim 38 including charging circuit means for pressurizing the hydraulic circuit means to a predetermined threshold operating pressure and for maintaining that pressure therein.

40. The improvement claimed in claim 39 including:
 (a) bypass means in the hydraulic circuit for bypassing the motor at wind speeds below some predetermined minimum operational wind speed; and
 (b) means for closing the bypass means upon the sensing of the predetermined minimum operational wind speed.

41. The improvement claimed in claim 39 wherein:
 (a) the closing means closes the bypass means slowly to avoid large dynamic loads on the propeller blades; and
 (b) the bypass means opens rapidly below the predetermined minimum operational wind speed.

42. The improvement claimed in claim 39 wherein the means for varying the displacement of the positive displacement motor includes:
 a displacement control motor operable in one direction of rotation to increase the displacement of the positive displacement motor and in the opposite direction of rotation to decrease the displacement of the positive displacement motor, and means to change the direction of rotation of the control motor in response to the command signal from the bridge circuit means.

43. The improvement claimed in claim 36 wherein the generator means maintains the speed of the positive displacement motor constant.

44. The improvement claimed in claim 43 including means for varying propeller speed as a function of pressure in the hydraulic circuit means and wind speed in accordance with a predetermined relationship that maximizes the power efficiency of the wind power generator, such means including means for varying the pressure in the hydraulic circuit means and for varying the displacement of the positive displacement motor, and circuit means operable to generate a signal that commands the displacement varying means to increase the displacement of the motor to increase propeller speed and increase the pressure in the hydraulic circuit means with increased wind speed and to decrease the displacement of the motor to decrease propeller speed and decrease the pressure in the hydraulic circuit means with decreased wind speed.

45. The improvement claimed in claim 44 including charging circuit means for pressurizing the hydraulic circuit means to a predetermined threshold operating pressure and for maintaining that pressure therein.

46. The improvement claimed in claim 43 including means for varying propeller speed as a function of pressure in the hydraulic circuit means and wind speed in accordance with a predetermined relationship that maximizes the power efficiency of the wind power generator.

47. The improvement claimed in claim 46 including charging circuit means for pressurizing the hydraulic circuit means to a predetermined threshold operating pressure and for maintaining that pressure therein.

48. The improvement claimed in claim 47 including:
 (a) bypass means in the hydraulic circuit for bypassing the motor at wind speeds below some predetermined minimum operational wind speed; and
 (b) means for closing the bypass means upon the sensing of the predetermined minimum operational wind speed.

49. The improvement claimed in claim 48 wherein:

(a) the closing means closes the bypass means slowly to avoid large dynamic loads on the propeller blades; and (b) the bypass means opens rapidly below the predetermined minimum operational wind speed.

50. The improvement claimed in claim 49 wherein the means for varying the displacement of the positive displacement motor includes:

a displacement control motor operable in one direction of rotation to increase the displacement of the positive displacement motor and in the opposite direction of rotation to decrease the displacement of the positive displacement motor, and means to change the direction of rotation of the control motor in response to the command signal from the bridge circuit means.

51. The improvement claimed in claim 46 including means to feather the propeller upon the sensing of the overspeeding of either the generator or the propeller.

52. The improvement claimed in claim 46 wherein the means for unfeathering the propeller blades includes fluid circuit means that in turn includes a fluid cylinder having a piston thereof operably coupled to the propeller blades to unfeather them upon the presence of a predetermined fluid pressure therein, means to pressurize the fluid cylinder, and the second disabling unfeathering means is operable to rapidly reduce the fluid pressure in the fluid cylinder to thereby feather the propeller blades.

53. The improvement claimed in claim 52 wherein the second disabling unfeathering means includes at least one normally open dump valve in circuit with the cylinder to dump the pressure therein upon the exceeding of the predetermined maximum pressure.

54. The improvement claimed in claim 53 including means for varying propeller speed as a function of pressure in the hydraulic circuit means and wind speed in accordance with a predetermined relationship that maximizes the power efficiency of the wind power generator, such means including means for varying the displacement of the positive displacement motor, and bridge circuit means operable to generate a signal that commands the displacement varying means to increase the displacement of the motor to increase propeller speed with increased wind speed and to decrease the displacement of the motor to decrease propeller speed with decreased wind speed.

55. The improvement claimed in claim 54 including charging circuit means for pressurizing the hydraulic circuit means to a predetermined threshold operating pressure and for maintaining that pressure therein.

56. The improvement claimed in claim 55 including:

(a) bypass means in the hydraulic circuit for bypassing the motor at wind speeds below some predetermined minimum operational wind speed; and (b) means for closing the bypass means upon the sensing of the predetermined minimum operational wind speed.

57. The improvement claimed in claim 56 wherein:

(a) the closing means closes the bypass means slowly to avoid large dynamic loads on the propeller blades; and (b) the bypass means opens rapidly below the predetermined minimum operational wind speed.

58. The improvement claimed in claim 57 including means to relieve excess pressure in the hydraulic circuit. means by shunting the positive displacement generator driving motor upon the occurrence of such excess pressure.

* * * * *